United States Patent [19]

Housworth et al.

[11] Patent Number: 5,103,110

[45] Date of Patent: Apr. 7, 1992

[54] PROGRAMMABLE POWER SUPPLY

[75] Inventors: Craig M. Housworth, Oklahoma City; Loyd V. Allen, Jr., Midwest City; Alfred W. Yakel, Edmond, all of Okla.

[73] Assignee: Keltronics Corporation, Oklahoma City, Okla.

[21] Appl. No.: 424,542

[22] Filed: Oct. 20, 1989

[51] Int. Cl.$^5$ .............................................. G05F 1/44
[52] U.S. Cl. .................................... 307/73; 307/296.1; 323/318; 323/350; 330/278; 330/125
[58] Field of Search ............................. 307/43, 72–76, 307/80, 82, 84, 260, 264, 270, 296.1; 363/86, 89, 95–97; 323/265, 266, 273, 274, 318, 349–354; 364/480, 481, 483, 492, 557, 718; 330/278, 295, 124 R, 129, 125

[56] References Cited

U.S. PATENT DOCUMENTS

| 3,577,064 | 5/1971 | Nercessian | 323/275 |
|---|---|---|---|
| 4,451,779 | 5/1984 | Griep | 323/312 |
| 4,484,295 | 11/1984 | Bedard et al. | 364/607 |
| 4,807,161 | 2/1989 | Comfort et al. | 364/550 |

OTHER PUBLICATIONS

Multidrive XL Power Supplies, Brochure, 6/89.
Electrophoresis Price List 1989, Brochure.
Put A Time Machine On Your Lab Bench, Brochure, ©1989.
World Power, KIK®, ©1989, Brochure.
100 kHw Switching Supplies, Programmable 1kW, CPRY. 1989.
Sorensen Power Supplies Full Line Catalog, date is not known but prior to Oct. 20 1989.
Tektronix 1990 Catalog, Your Visible Edge.
Programmable Power Supplies and Dynaloads, Brochure, date is not known but prior to Oct. 20, 1989.
Digital Automatic Test Equipment, Brochure, date is not known but prior to Oct. 20, 1989.
Lambda '89 Power Supplies, The New LLS Series, Catalog.
PPS Series System, Brochure, ©1989.
1988/89 Programmable/Manual, Catalog, Electronic Development Corp.
Elgar at 8000, Programmable DC Power System, Brochure, date is not known but prior to Oct. 20, 1989.
DC Power Supply Catalog with Electronic Load, 1989/90, Hewlett Packard.
Tutorial Description of the Hewlett-Packard Interface Bus. Cat. CPR 1980.
Precision Manual or Programmable Voltage and Current Source . . . date is not known but prior to Oct. 20, 1989, IET Labs.
Classical LC Electrophoresis, 80 page Catalog, ©1988, ISCO.
The Kepco Power Managers and Power Management Systems, copyright 1987.
Kepco Instrumentation Power Supplies for System and Bench . . . copyright 1989.
HPLC Microbore LC SFC, ISCO Catalog 24, 64 pages, ©'87 '89.

(List continued on next page.)

Primary Examiner—A. D. Pellinen
Assistant Examiner—David Osborn
Attorney, Agent, or Firm—Dunlap, Codding & Lee

[57] ABSTRACT

A programmable power supply having a plurality of channels wherein each channel is adapted to output a selectable DC voltage, AC voltage, DC current or AC current. Each channel is adapted to select a DC reference signal or an AC reference signal and to scale the selected DC reference or the AC reference to output the selected signal. The outputted selected signals are monitored to provide a monitored channel signal indicating the value of the selected signal. The programmable power supply outputs monitored channel signals for each of the channels in a human perceivable format such as a display or printed format. At least some of the channels are adapted to be connectable to a temperature probe which outputs temperature signals and, in this embodiment, the temperature signals are monitored to provide monitored channel temperature signals, the monitored channel temperature signals being outputted in a human perceivable format such as a display or printed format or both.

31 Claims, 11 Drawing Sheets

OTHER PUBLICATIONS

Keithley, Model 2243 instruction Manual, Pub. 11-87.
The New Star, Standard Powr Full-Line Catalog, 11-88.
Expanded Capability, Power Supplies, EL 2000 Series, Arnold Magnetics Corp., date is not known but prior to Oct. 20, 1989.
Power Supplies, A Higher Level of Performance, Brochure, date is not known but prior to Oct. 20, 1989, Arnold Magnetics Corp.
Power Supplies Full Line Catalog, Spring 1989, ACDC Electronics.
Miniaturized Power Supplies, Brochure, Bulletin 88-07, Acopian.
COM6000 "In A World Of It's Own", Brochure, CEAG, date is not known but prior to Oct. 20, 1989.
Specifying Power Supplies, Brochure, Custom Power Systems, Inc., date is not known but prior to Oct. 20, 1989.
Special Power Requirements Need Special Skills, Brochure, date is not known but prior to Oct. 20, 1989, Custom Power Systems, Inc.
A Short Form Guide to Preferred Power . . . 1989, Broch., Computer Products.
International Series D.C. Power Supplies, Brochure, date is not known but prior to Oct. 20, 1989.
Power Supply Engineering Handbook, ©1987, Computer Products.
Digitec, Brochure, ©1989.
Digitec Model IQ280A, Brochure, ©1987.
Digitec Model 6400/6600A, Brochure, ©1989.
Digitec Model 5830, Brochure, date is not known but prior to Oct. 20, 1989.
Series 1100, Data Loggers, Brochure, Jul. 1987, Diti-Tec.
International Power Devices, 1989/90, Brochure.
High Current DC Power Supplies, Brochure, JETTA Power Systems, date is not known but prior to Oct. 20, 1989.
Universal Voltronics Corporation, ©1989, BRC Model Brochure.
Universal Voltronics Corporation, Brochure, Apr. 1989.
Vicor Express Component Power Solutions, Brochure, Copyright 1990.
Strassburg, Dan, Assoc. Ed., "Technology Update", EDN mag. 2-2-89, pp. 71-82.

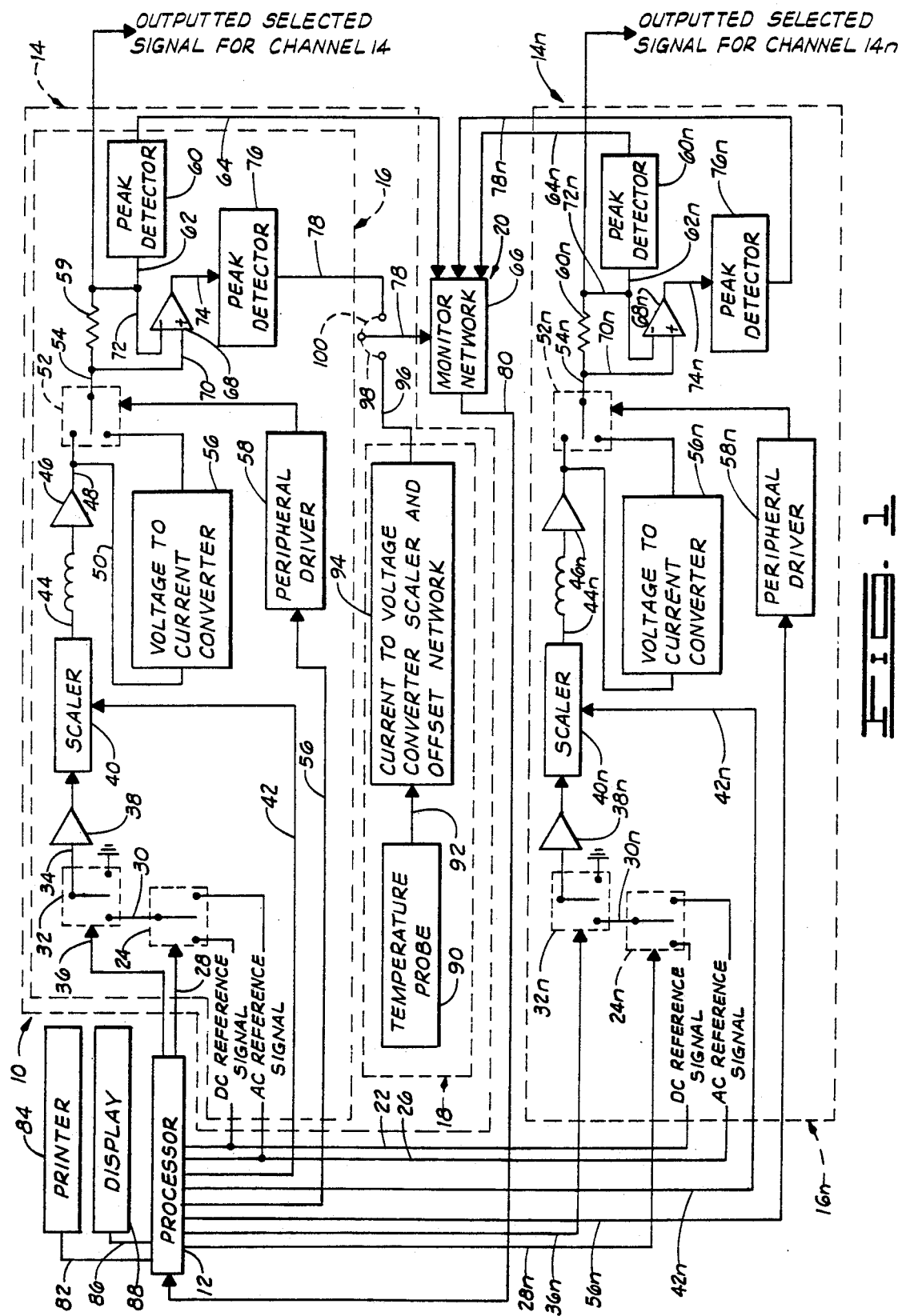

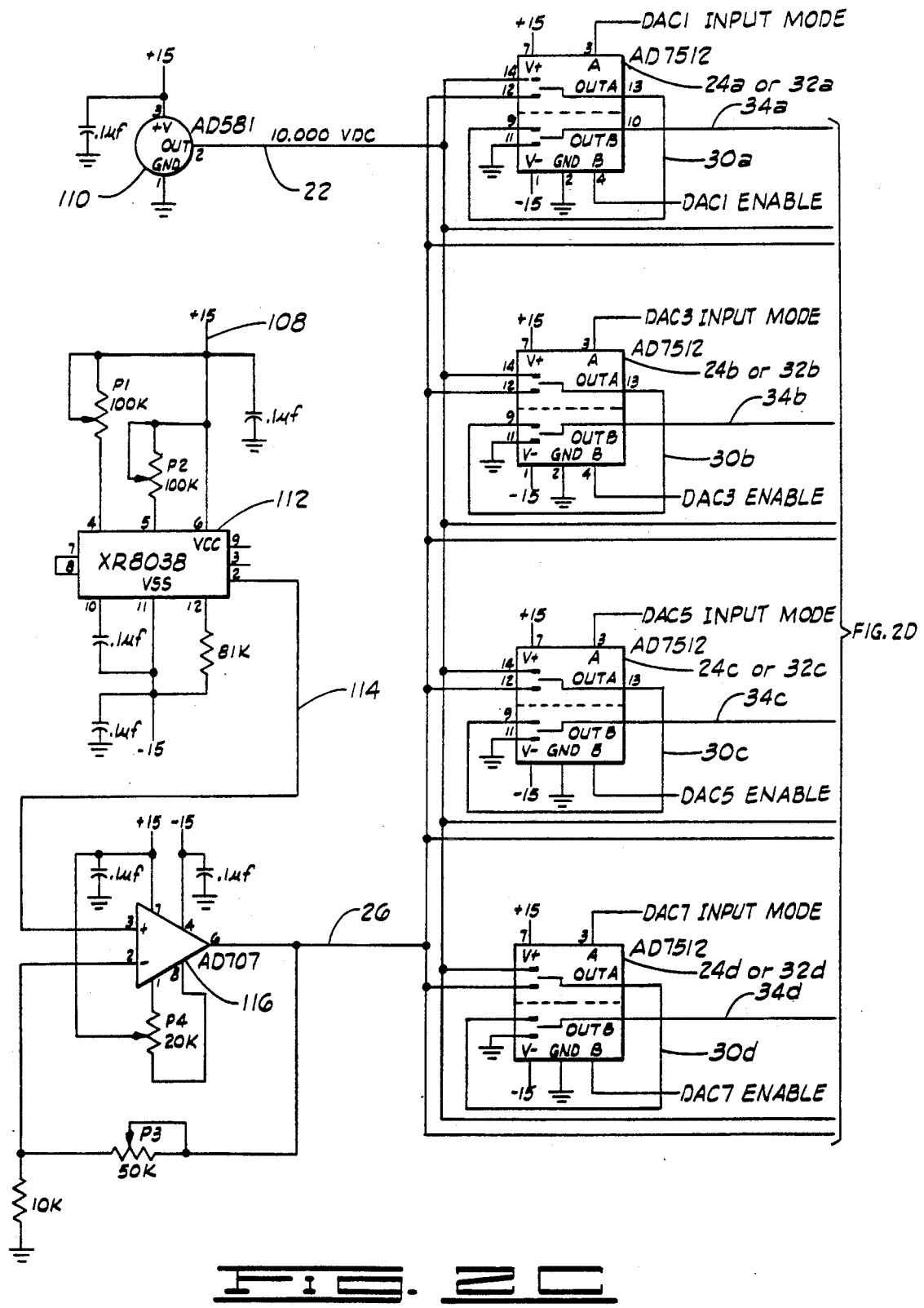

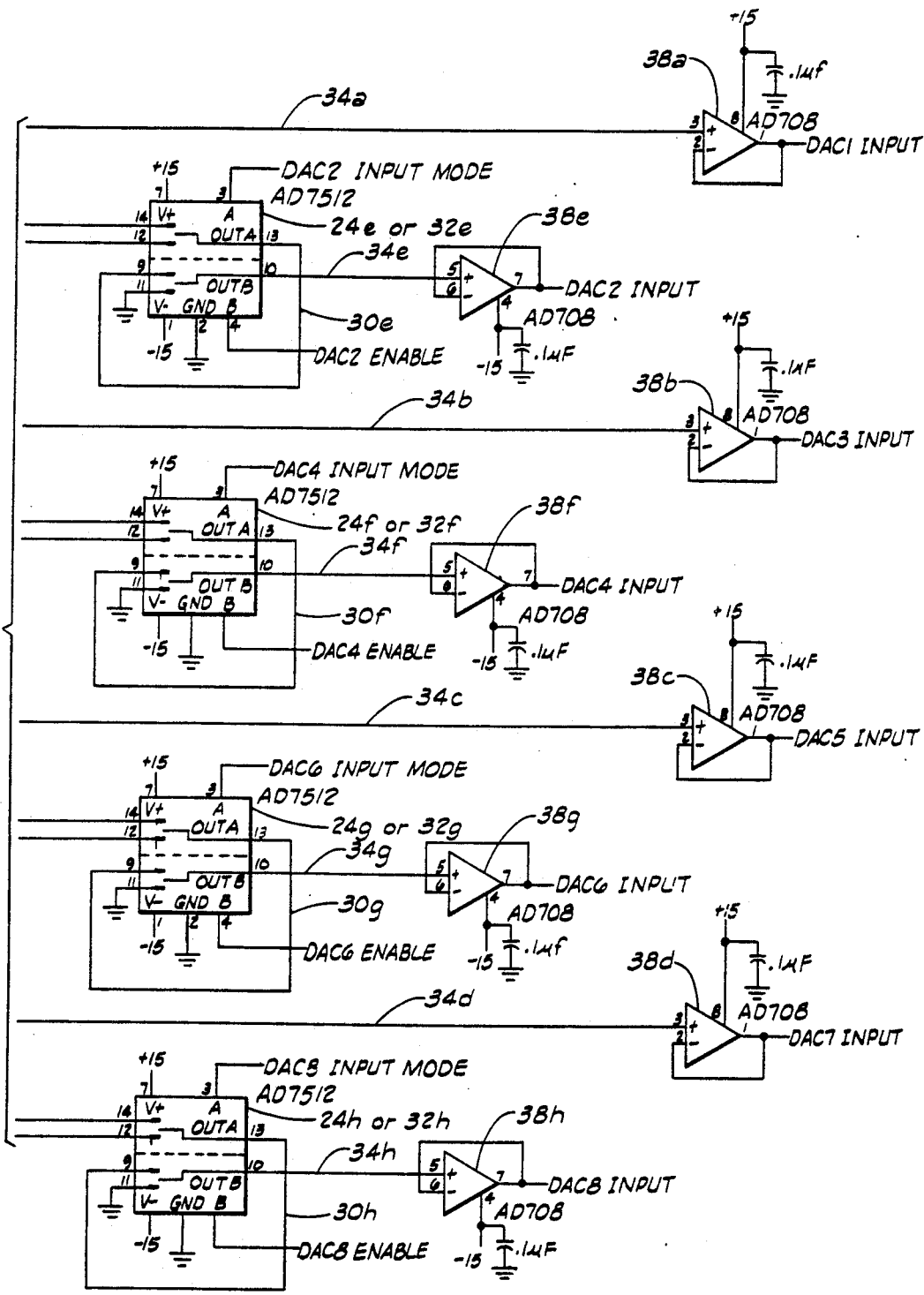
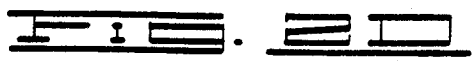

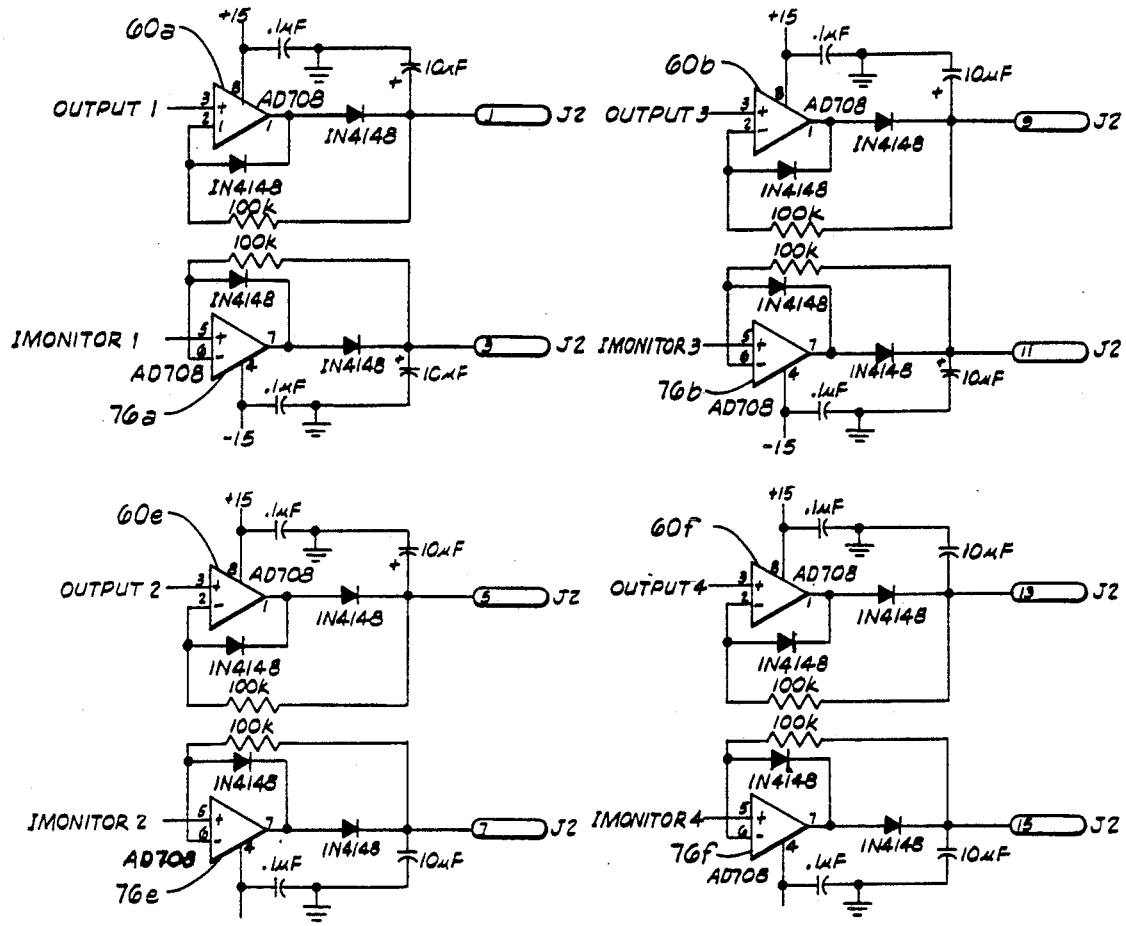
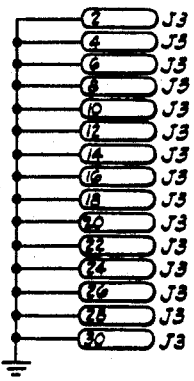
FIG. 21

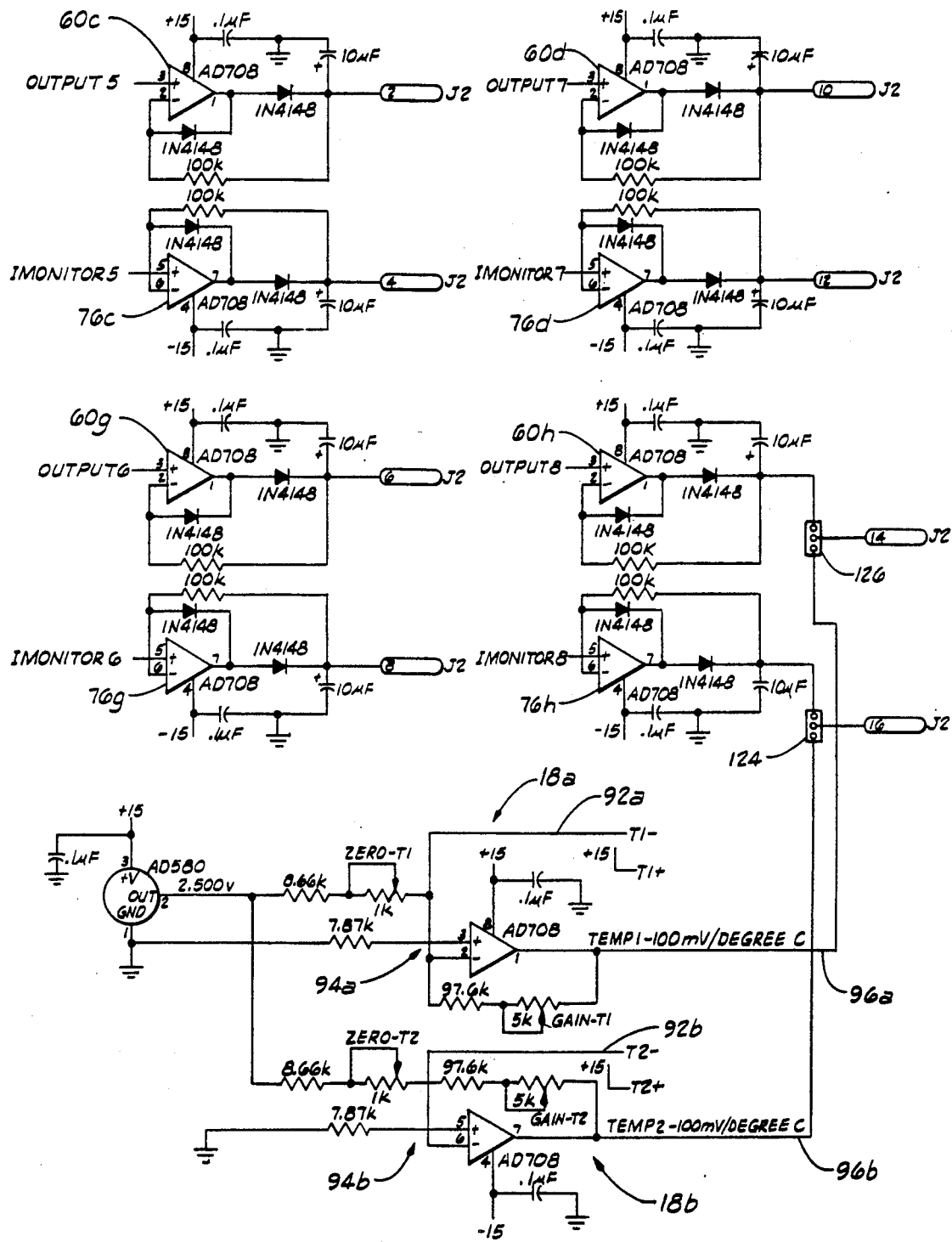

PROGRAMMABLE POWER SUPPLY

FIELD OF THE INVENTION

The present invention relates generally to programmable power supplies having a plurality of channels wherein each channel is adapted to output a selected signal (a selected DC or AC voltage or a selected DC or AC current) and wherein the voltage and current of the selected signals are monitored and, monitored signals are outputted periodically in a human perceivable format.

BRIEF DESCRIPTION OF THE DRAWINGS

FIG. 1 is a diagrammatic, schematic view showing a programmable power supply constructed in accordance with the present invention.

FIGS. 2A, 2B, 2C, 2D, 2E, 2F, 2G, 2H, 2I and 2J comprise a schematic showing the details of construction of eight channels of the power supply wherein one of the channels includes a temperature sensing network associated therewith. In one preferred form, these eight channels are duplicated and connected to a processor for providing a sixteen channel power supply with two of the channels having associated therewith a temperature sensing network.

DESCRIPTION OF THE PREFERRED EMBODIMENTS

Figure 2A:
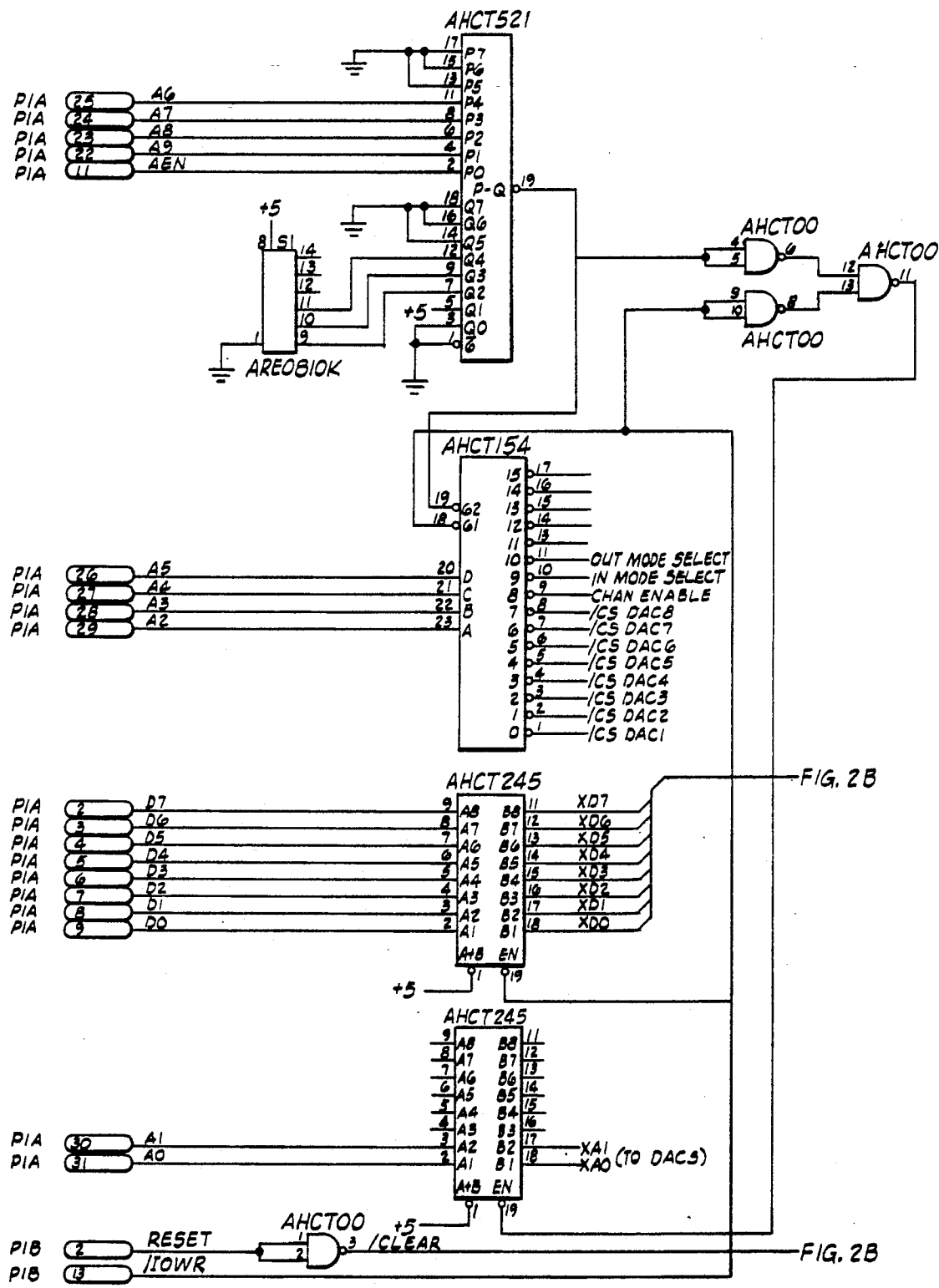

Shown in FIG. 1 is a programmable power supply 10 which is constructed in accordance with the present invention. As diagrammatically shown in FIG. 1, the programmable power supply 10 includes processor 12 connected to a plurality of channels, only two channels being shown in FIG. 1 and designated therein by the reference numerals 14 and 14n. Each channel 14 includes a select signal network 16. Each of the select signal networks 16 are identical in construction and operation, and like components in the channel 14n have been designated with reference numerals identical to the corresponding components in the channel 14 except the additional designation "n" has been added to each reference numeral.

Some or all of the channels 14 may also include a temperature sensing network 18. The channel 14 shown in FIG. 1 includes the temperature sensing network 18 while the channel 14n does not include a temperature sensing network 18. In one operational embodiment, the programmable power supply 10 includes sixteen channels 14 and two of these channels 14 include the temperature sensing network 18.

The programmable power supply 10 also includes a monitor control network 20. The monitor control network 20 is adapted to monitor the voltages and current of each selected signal outputted by each of the channels 14. The monitor control network 20 outputs the monitored voltages and currents and cooperates with the processor 12 portion of the monitor control network 20 for outputting the monitored voltages and currents in a human perceivable format such as by a display visually perceivable or a printed format.

In general, each channel 14 receives a reference signal from the processor 12 and each channel 14 is adapted to scale the reference signal to a predetermined programmed value to provide a selected signal. The selected signal is outputted by each of the channels 14. Each of the channels 14 may provide the same value selected signal output or the channels 14 may provide different values selected signal output as determined by the operator of the programmable power supply 10. The selected signal output of each of the channels 14 is a DC voltage selected signal having a selected voltage value, a DC current selected signal having a selected current value, an AC voltage selected signal having a selected peak voltage value or an AC current selected signal having a selected peak current value. In any event, the selected signals outputted by each of the channels 14 are inputted into the monitor control network 20 and the monitor control network 20 monitors the voltage and current value of each of the selected signals outputted by the channels 14. The monitor control network 20 cooperates to provide periodically output monitored voltages and currents of the selected signals of the channels 14 in a human perceivable format. As mentioned before, some or all of the channels 14 may include the temperature sensing network 18. The temperature sensing network 18 is adapted to sense the temperature of some selected object (not shown) and to output temperature signals indicating the value of the sensed temperature. The temperature signals outputted by the temperature sensing network 18 are inputted into the monitor control network 20. The monitor control network 20 monitors the value of the temperature signals and cooperates to output the value of the temperature signals periodically in a human perceivable format such as via a display visually perceivable or a printed format.

The processor 12 outputs a DC reference voltage signal over a signal path 22 which is connected to an electronic switch 24 (designated "DC REFERENCE SIGNAL" in FIG. 1). The processor 12 also outputs an AC reference voltage signal over a signal path 26 which also is connected to the electronic switch 24 ( designated "AC REFERENCE SIGNAL" in FIG. 1).

The processor 12 is adapted to output a plurality of switch signals (sometimes referred to herein as "first switch signals") over signal path 28. Each of the switch signals is inputted into the electronic switch 24 in one of the channels 14. Each switch signal on the signal path 28 indicates the selection of the DC reference voltage signal or the AC reference voltage signal. In response to receiving the switch signal on the signal path 28, the switch 24 is operated to be connected to either the signal path 22 or the signal path 26 for outputting either the selected DC reference voltage signal or the selected AC reference voltage signal over a signal path 30. The signal path 30 is connected to another electronic switch 32. The electronic switch 32 is connected to a signal path 34 and is adapted to connect the signal path 34 to ground or to the signal path 30.

The processor 12 is programmed to output a plurality of switch signals with each switch signal being outputted on a signal path 36. Each switch signal on the signal path 36 indicates a ground instruction or a signal path instruction. Each of the switch signals on the signal paths 36 is inputted into the switch 32 in one of the channels 14. Each switch 32 is adapted to connect the signal path 34 in one of the channels 14 to the signal path 30 if the received switch signal includes the signal path instruction or to ground if the received switch signal includes the ground instruction. When the power supply 10 initially is turned on the condition or state of the various switches is not known. The processor 12 is programmed to output the switch signals on the signal paths 36 indicating a ground instruction when the processor 12 initially is turned on thereby causing each of the switches 32 to connect the signal paths 34 to ground.

Assuming the signal path 34 is connected to the signal path 30 via the switch 32, the AC or DC reference voltage signal is outputted from the switch 32 on the signal path 34. The outputted AC or DC reference voltage signal is passed through a buffer 38 and inputted into a scaler 40.

The processor 12 is programmed to output a plurality of scale signals with each scale signal indicating a predetermined or desired valve of voltage or peak voltage. Each scale signal is inputted into the scaler 40 in one of the channels 14. Each scaler 40 is adapted to receive the scale signal on a signal path 42. In response to receiving the scale signal, each scaler 40 is constructed and adapted to scale the voltage or peak voltage of the received DC or AC reference voltage signal to the value indicated by the scale signal 40 received via the signal path 42, and to output the scaled DC or AC reference voltage signal on a signal path 44.

The scaled DC or AC reference voltage signal on the signal path 44 is passed through a buffer 46. The scaled DC or AC reference voltage signal is outputted from the buffer 46 onto either a signal path 48 or a signal path 50 as determined by an electronic switch 52.

The electronic switch 52 is adapted to connect the signal path 54 to either the signal path 48 or the signal path 50. The processor 12 is programmed to output a plurality of switch signals (sometimes referred to herein as "second switch signals") on signal paths 56. Each switch signal on the signal path 56 is inputted into one of the channels 14. Each switch signal on the signal paths 56 indicates the selection of voltage or current. Each switch signal on the signal path 56 is passed through a peripheral driver 58 and inputted into one of the switches 52. The switch signal on the signal path 56 indicates which signal path 48 or 50 the switch 52 is to connect to the signal path 54.

Assuming the selected signal is the scaled DC or AC reference voltage signal, the processor 12 is programmed to output the switch signal on the signal path 56 to select voltage and, in response, the switch 52 connects the signal path 54 to the signal path 48. If the selected signal is a DC or AC reference current signal, the processor 12 is programmed to output a switch signal on the signal path 56 to select current and, in response, the switch 52 to connects the signal path 54 to the signal path 50. If the selected signal is a DC or AC reference current signal, the scaled DC or AC reference voltage signal on the signal path 50 is passed through a voltage to current converter 58 for converting the scaled DC or AC reference voltage signal on the signal path 50 to a scaled DC or AC reference current signal which is outputted by the voltage to current converter 56 and inputted into the switch 52. The selected signal outputted by the switch 52 is passed through a resistor 59 and outputted from the channel 14 as a selected signal.

Assuming a DC signal having a selected voltage valve is desired to be outputted from the channel 14, the processor 12 outputs a switch signal indicating DC reference voltage signal on the signal path 28 causing the switch 24 to connect the signal path 22 to the signal path 30. The processor 12 outputs a scale signal on the signal path 56 indicating the value of the voltage desired to be outputted from the channel 14. The processor 12 outputs a switch signal on the signal path 36 causing the switch 32 to connect the signal path 30 to the signal path 34. In this example, the processor 12 also outputs a switch signal indicating voltage on the signal path 56 causing the switch 52 to connect the signal path 54 to the signal path 48. The DC reference voltage signal is passed through the buffer 38 and inputted into the scaler 40 where the value of the voltage of the DC reference voltage signal is scaled to a preselected value as indicated by the scale signal. The scaler 40 outputs the scaled DC reference voltage signal on the signal path 44 which is passed through the buffer 46 and over the signal path 48. The scaled DC reference voltage signal on the signal path 48 is passed through the switch 50 and outputted from the channel 14 on the signal path 54 as the selected signal.

Assuming an AC voltage signal having a predetermined or desired peak voltage value is desired to be outputted on the channel 14, the processor 12 is provide a switch signal indicating AC reference voltage signal on the signal path 28 causing the switch 24 to connect the signal path 30 to the signal path 26. In this instance, the AC reference voltage signal is outputted on the signal path 30. The processor 12 in this example is programmed to output a switch signal on the signal path 36 causing the switch 32 to connect the signal path 30 to the signal path 34 thereby causing the AC reference voltage signal to be outputted from the switch 32. The AC reference voltage signal outputted on the signal path 34 is passed through the buffer 38 and inputted into the scaler 40. The processor 12 is programmed to output a scale signal indicating the desired peak voltage value. The scaler 40 scales the inputted AC reference voltage signal to a predetermine peak voltage value as indicated by the scale signal outputted by the processor 12 on the signal path 42. The scaled AC reference voltage signal outputted by the scaler 40 is passed through the buffer 46 over the signal path 48 and through the switch 52. The switch 52 outputs the scaled AC reference voltage signal over the signal path 54 which in this instance is the outputted selected signal for the channel 14.

Assuming that a DC current signal having a desired or predetermined current value is desired to be outputted over the channel 14, the processor 12 is programmed to output a switch signal indicating the selection of DC reference voltage signal on the signal path 28 causing the switch 24 to connect the signal path 22 to the signal path 30. The processor 12 is programmed to output a switch signal over the signal path 36 for causing the switch 32 to connect the signal path 30 to the signal path 34. The DC reference voltage signal is outputted from the switch 32 passed through the buffer 38 and inputted into the scaler 40. The processor 12 is programmed to output a scale signal indicating the desired or predetermined value of the current. The scaler 40 scales the value of the current of the DC reference voltage signal to a predetermined value as determined by the scale signal outputted by the processor 12 over the signal path 42. The scaled DC voltage reference signal is outputted by the scaler 40 and passed through the buffer 46. In this example, the switch signal outputted by the processor 12 on the signal path 56 indicates current selection thereby causing the switch 52 to connect the signal path 54 with the signal path 50. The scaled DC reference voltage signal is passed through the voltage to current converter 58 converting the scaled DC reference voltage signal to the scaled DC reference current signal. The scaled DC reference current signal is outputted by the voltage to current converter 58, passed through the switch 52 and outputted over the signal path 54 as the selected signal.

Assuming it is desired to have the channel 14 output an AC current signal having a predetermined or desired peak current value, the processor 12 is programmed to output a switch signal indicating selection of AC reference voltage signal on the signal path 28 for causing the switch 24 to connect the signal path 26 to the signal path 30. The processor 12 also is programmed to output a switch signal on the signal path 36 for causing the switch 32 to connect the signal path 34 to the signal path 30. In this instance, the AC reference voltage signal is passed through the switches 24 and 32, through the buffer 38 and inputted into the scaler 40. The processor 12 is programmed to output a scale signed on the signal path 56 indicating the desired peak current value. The scaler 40 scales the current of the AC reference voltage signal to a predetermined peak current value and outputs the scaled AC reference voltage signal over the signal path 44. In this instance, the processor 12 also is programmed to output a switch signal indicating the selection of current on the signal path 56 for causing the switch 52 to connect the signal path 54 to the signal path 50. The outputted scaled AC reference voltage signal is inputted into the voltage to current converter 58. The voltage to current converter 58 converts the scaled AC reference voltage signal to the scaled AC reference current selected signal which is passed through the switch 52 and outputted over the signal path 54 as the selected signal.

The outputted selected signal on the signal path 54 is passed through a peak detector 60 by way of a signal path 62. The peak detector 60 outputs a DC signal over a signal path 64 having a DC voltage equal to the maximum value of the voltage of the selected signal. If the selected signal on the signal path 54 more particularly is a DC voltage selected signal, the peak detector 60 merely outputs the inputted DC voltage. However, if the selected signal on the signal path 54 more particularly is an AC voltage selected signal, the peak detector 60 detects the peak voltage of the inputted AC selected signal and outputs on the signal path 64 a DC voltage equal to the detected peak voltage of the inputted AC voltage selected signal. The DC voltage signal on the signal path 64 is inputted into a monitor network 66.

An amplifier 68 is connected across the resistor 59 via a signal paths 70 and 72. The amplifier 68 is adapted to output a voltage proportional to the current flowing the resistor 60 or, in other words, the current value of the selected signal outputted on the signal path 54. The signal outputted by the amplifier 68 is outputted over a signal path 74 and passed through a peak detector 76. In a manner like that described before with respect to the peak detector 60, if the selected signal more particularly is a DC current or DC voltage selected signal, the peak detector 76 will merely output the DC voltage outputted by the amplifier 68. On the other hand, if the selected signal more particularly is an AC voltage or an AC current selected signal, the voltage proportional to current outputted by the amplifier 68 will be AC and the peak detector 76 will output a DC voltage equal to the peak of the inputted AC voltage. The peak detector 76 outputs the DC voltage proportional to the current flowing through the resistor 59 over a signal path 78 which in one embodiment is inputted into the monitor network 66 over a signal path 78.

The monitor network 66 receives the DC signal proportional to the current value of the selected signal over a signal path 78 and the monitor network 66 receives a DC voltage equal to the DC voltage or peak AC voltage of the selected signal over a signal path 64. The monitor network constantly monitors the current and voltage of the outputted selected signal for each channel 14.

The monitor network 66 outputs the monitored voltage and current signals to the processor 12 by way of a signal path 80. The processor 12 is programmed to store the monitored voltage and current signals and to output at predetermined intervals of time the monitored voltage and current signals in a human perceivable format. More particularly, the processor 12 is programmed at predetermined intervals of time to output the monitor voltage and current signals over a signal path 82 which are inputted into a printer 84. The printer 84 is constructed and adapted to output the monitored voltage and current signals in a human perceivable printed format.

The processor 12 also is programmed and adapted to output the monitor voltage and current signals at predetermined intervals of time over a signal path 86 which are inputted into a display 88. The display 88 is constructed and adapted to display the monitored voltage and current signals in a visually human perceivable format. As mentioned before, some or all of the channels 14 also include the temperature sensing network 18. The temperature sensing network 18 comprises a temperature probe 90. The temperature probe 90 is constructed and adapted to measure the temperature of a predetermined or selected object (not shown) and to output temperature signals on a signal path 92 which are proportional to the value of the measured temperature levels. The temperature probe 90 outputs DC current temperature signals proportional to the sensed temperature and these signals are inputted into a current to voltage converter, scaler and offset network 94 which is adapted to output a DC voltage proportional to the temperature sensed by the temperature probe 90 scaled to zero. The temperature signals are outputted by the current to voltage converter scaler and offset network 94 on signal path 96 and inputted into the monitor network 66 via the signal path 68.

When the channel 14 is operating in the temperature sensing mode of operation, the signal path 96 is connected to the signal path 68 via a jumper 98. When the channel 14 is operating in the selected signal output mode a jumper 100 connects the signal path 78 to the signal path 68.

The monitor network 66 outputs the temperature signals on the signal path 80 which are received and stored by the processor 12. The processor 12 is adapted at predetermined intervals of time to output the temperature signals on the signal path 82 to the printer 84 where the temperature signals are outputted in a printed format. In addition, the processor 12 also is programmed at predetermined intervals of time to output the temperature signals on the signal path 86 to the display 88 where the temperature signals are displayed in a visually human perceivable format.

Figure 2B:
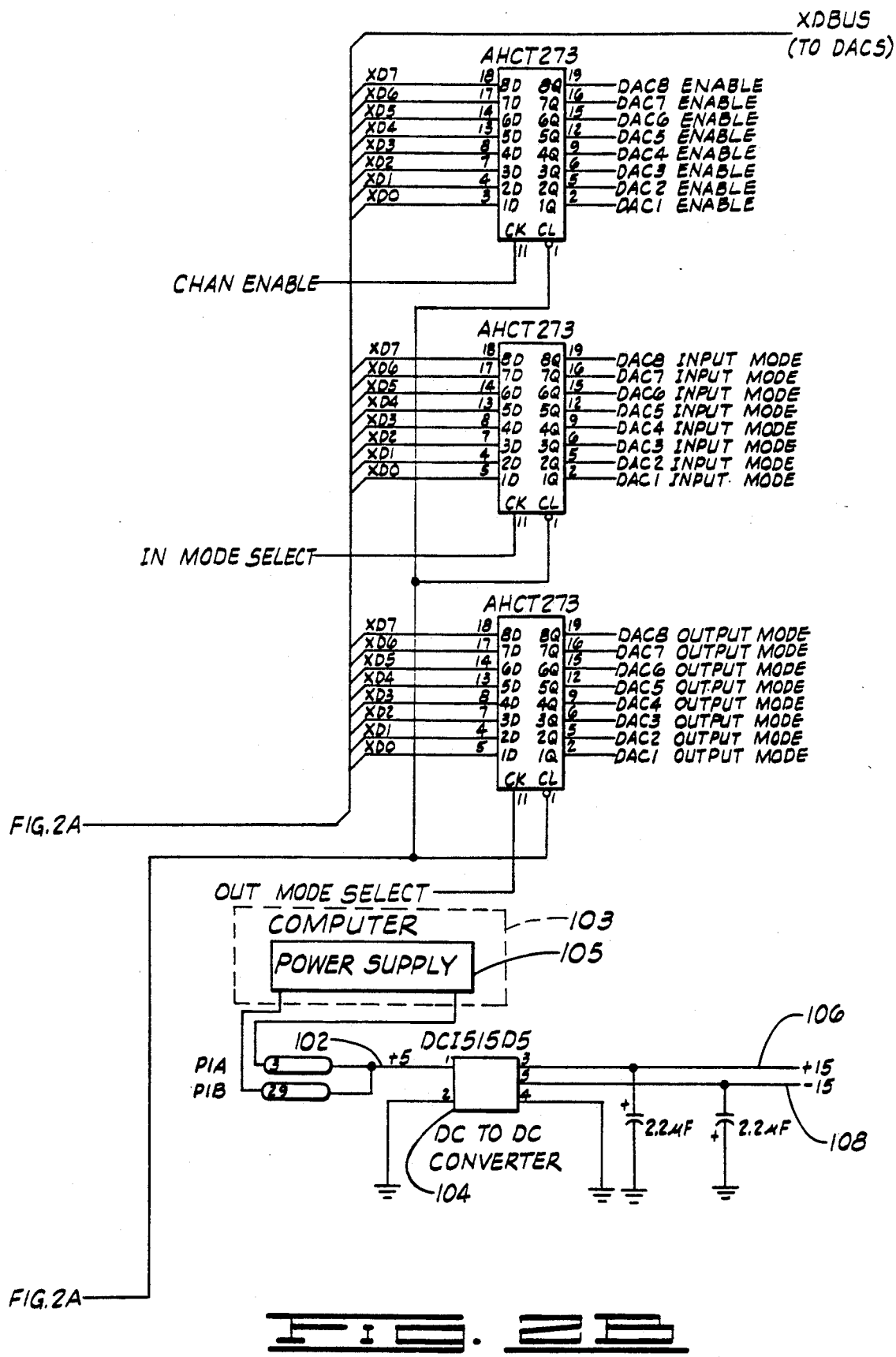

Shown in FIGS. 2A and 2B are the various circuit elements which interface between the processor 12 and each of the channels 14. FIGS. 2A and 2B shows the interface devices for eight channels and, as mentioned before, preferably virtually all of the circuits in FIG. 2 are duplicated to provide a programmable power supply 10 with sixteen channels 14. In FIGS. 2A and 2B, the pins labeled "P1A" and "P1B" are connected to the processor 12. The processor 12 includes a general purpose digital computer which has available a five volt DC power supply (the general purpose digital computer being shown in FIG. 2B and designated therein as "COMPUTER" and the reference numeral 103 and the computer power supply being shown in FIG. 2B and designated with the reference numeral 105). This DC power supply available at the processor 12 is inputted over a signal path 102 (FIG. 2B) into a DC to DC converter 104 (FIG. 2B) which is adapted to output a plus fifteen volt DC signal over a signal path 106 (FIG. 2B) and a minus fifteen volt DC signal over a signal path 108 (FIG. 2B). The signal path 106 is inputted into a chip 110 (FIG. 2B) which is adapted to output the ten volt DC reference voltage signal on the signal path 22 (FIG. 2B). The fifteen volt DC signal on the signal path 108 is inputted into an AC generator 112 (FIG. 2C) which is adapted to output a 7.5 volt sinewave AC signal on a signal path 114 (FIG. 2C). The AC signal on the signal path 114 is inputted into an amplifier 116 (FIG. 2C) where the AC inputted signal is scaled and offset to provide the plus and minus ten volt AC reference voltage signal on the signal path 26 (FIG. 2C).

Shown in FIGS. 2C and 2D are eight switches 24 designated in FIGS. 2C and 2D by the respective reference numerals 24a, 24b, 24c, 24d, 24e, 24f, 24g and 24h. The signals outputted by the respective switches 24 on the signal path 30 (designated in FIG. 2C and 2D by the respective reference numeral 30a, 30b, 30c, 30d, 30e, 30f, 30g and 30h) each are inputted and passed through the respective amplifiers 118 (designated in FIG. 2D by the respective reference numerals 118a, 118b, 118c, 118d, 118e, 118f, 118g and 118h).

The DC reference voltage signal on the signal path 22 and the AC reference voltage signal on the signal path 26 are each inputted to the eight switches 24 (designated in FIGS. 2C and 2D by the reference numeral 24a, 24b, 24c, 24d, 24e, 24f, 24g and 24h, respectively). The output signal from the switch 24 is passed to the switch 32 over the signal path 30 (eight switches 32 being shown in FIG. 2C and 2D and designated by the respective reference numerals 32a, 32b, 32c, 32d, 32e, 32f, 32g and 32h, respectively and the signal paths 30 being designated by the respective reference numerals 30a, 30b, 30c, 30d, 30e, 30f, 30g and 30h in FIGS. 2C and 2D). The signal is outputted from the switches 32 over the signal path 34 (the eight respective signal paths 34 being shown in FIGS. 2C and 2D and designated by the respective reference numerals 34a, 34b, 34c, 34d, 34e, 34f, 34g and 34h). The signals on the signal path 34 are passed through the buffer amplifier 38 (the eight respective buffer amplifiers being shown in FIG. 2D and designated by the respective reference numerals 38a, 38b, 38c, 38d, 38e, 38f, 38g and 38h, respectively).

Figure 2E:
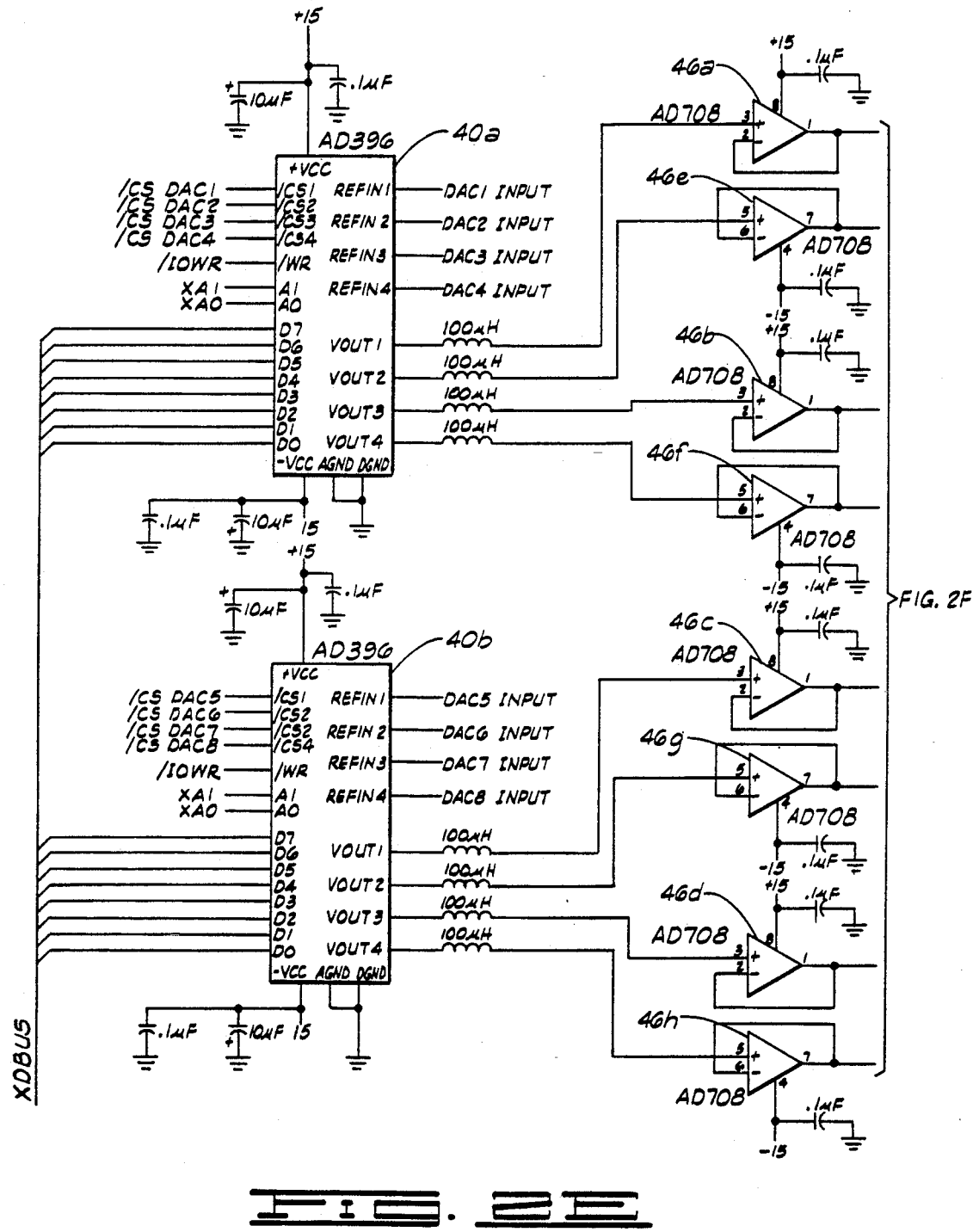
Figure 2F:
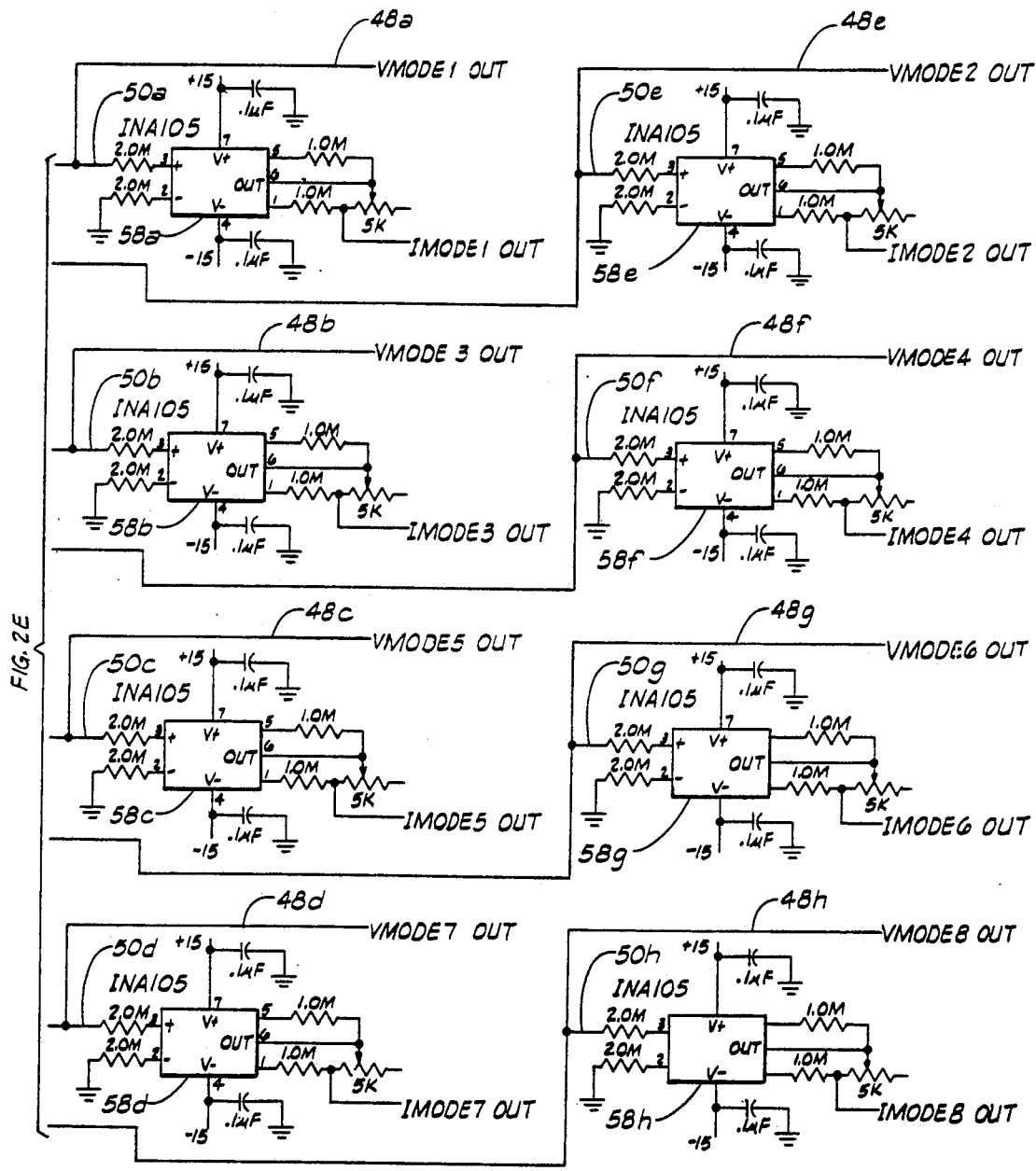

The outputs from the buffer amplifiers 38 (FIG. 2D) are inputted into the scalers 40 (FIG. 2E). With respect to the eight channels shown in FIG. 2, two scalers 40 are utilized and the two scalers 40 shown in FIG. 2E are designated by the respective reference numerals 40a and 40b. The outputs from the amplifiers 38a, 38e, 38b and 38f each are inputted into the scaler 40a. The outputs from the amplifiers 38c, 38g, 38d and 38h are each inputted into the scaler 40b. The scaler outputs are inputted and passed through an amplifier 46 and there are eight amplifiers 46 one for each channel shown in FIG. 2E and designated therein respectively by the reference numerals 46a, 46b, 46c, 46d, 46e, 46f, 46g and 46h. The outputs from the amplifiers 46 in one mode are outputted over the signal paths 48 (eight signal paths being shown in FIG. 2F and designated by the respective reference numeral 48a, 48b, 48c, 48d, 48e, 48f, 48g and 48h). In one other mode of operation the amplifiers 46 output is connected to the voltage to current converter 58 via a signal path 50 (four signal paths 50 being shown in FIG. 2F and designated respective therein by the reference numeral 50a, 50b, 50c, 50d, 50e, 50f, 50g and 50h and eight voltage to current converter 58 being shown in FIG. 2C and designated therein respectively by the reference numerals 58a, 58b, 58c, 58d, 58e, 58f, 58g and 58h).

Figure 2G:
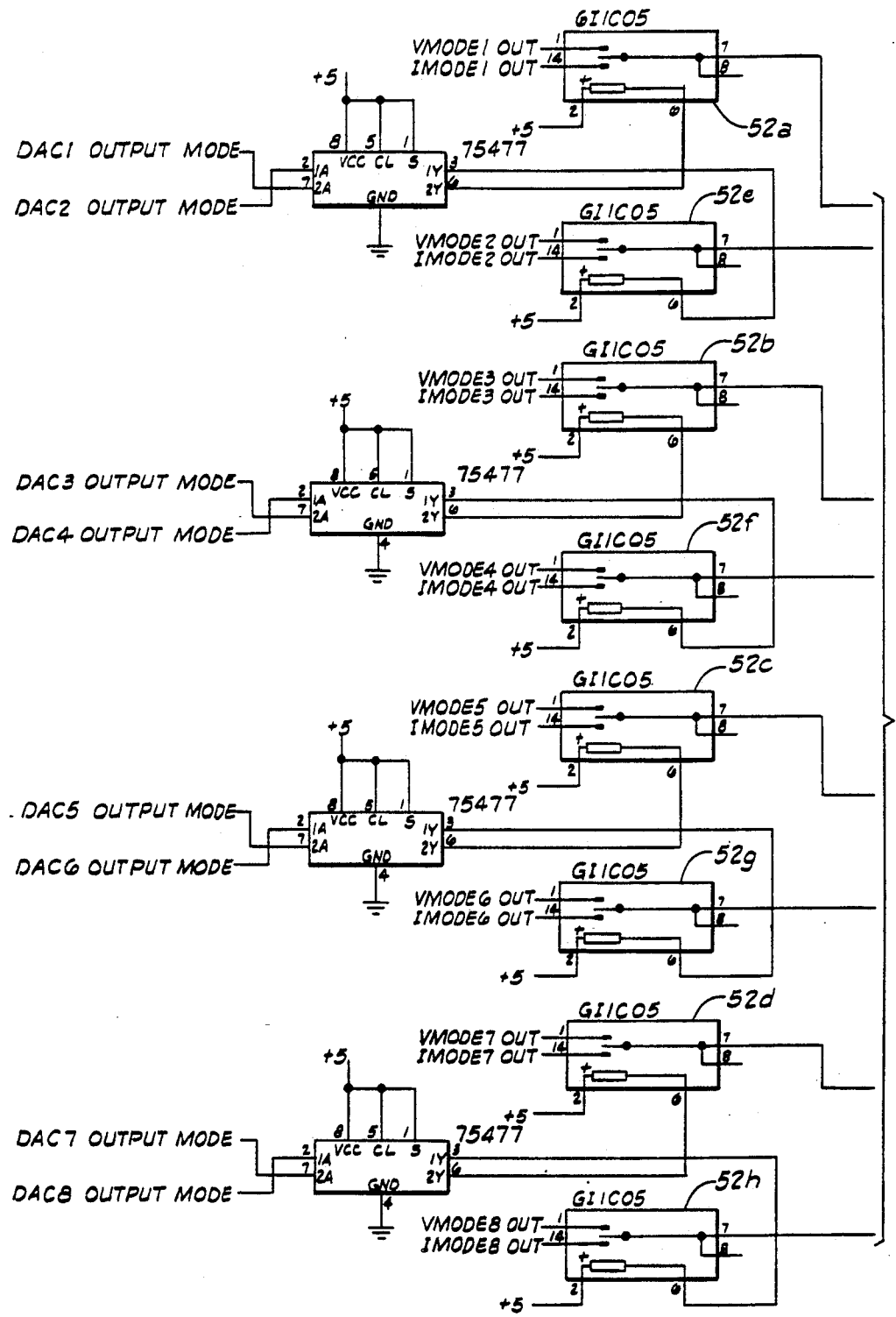
Figure 2H:
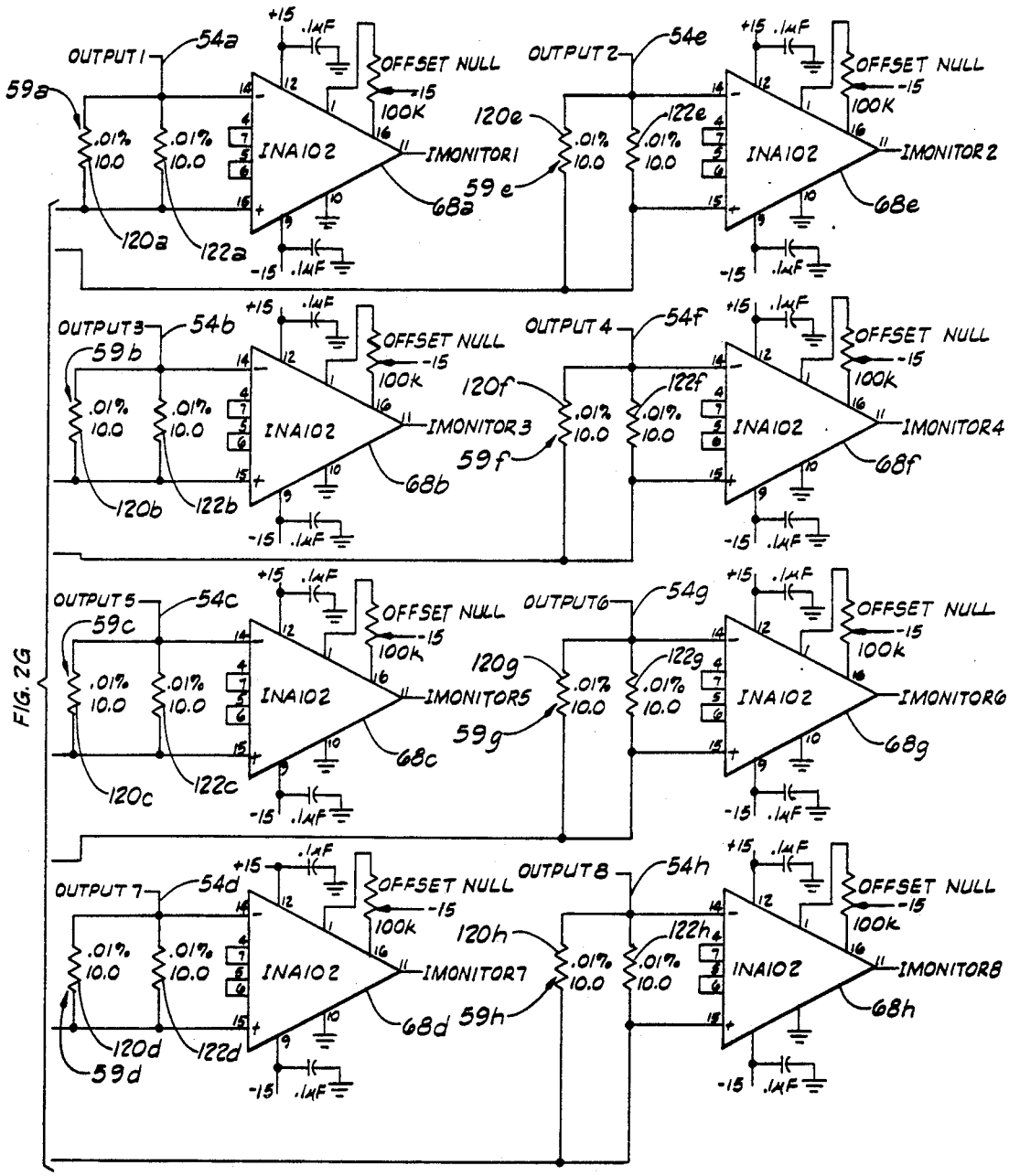

The outputs of the eight voltage to current converters 58 (FIG. 2F) each are connected to one of the switches 52 (eight switches being shown in FIG. 2G and designated therein by the respective reference numerals 52a, 52b, 52c, 52d, 52e, 52f, 52g and 52h). The output from each of the switches 52 is passed through the resistor 59 and, as shown in FIG. 2H, the resistor 59 actually comprises two resistors 120 and 122 (the eight resistors being designated in FIG. 2H by the respective reference numerals 59a, 59b, 59c, 59d, 59e, 59f, 59g and 59h and the resistors 120 and 122 being designated by the respective reference numerals in FIG. 2H of 120a, 120b, 120c, 120d, 120e, 120f, 120g and 120h and 122a, 122b, 122c, 122d, 122e, 122f, 122g and 122h. The resistor 59 are connected to the input of the amplifier 68 and eight amplifiers 68 are shown in FIG. 2H and designated by the respective reference numeral 68a, 68b, 68c, 68d, 68e, 68f, 68g and 68h.

The selected signal on the signal path 54 also is connected to the peak detector 60 by way of the signal path 62. Shown in FIGS. 2I and 2J are eight peak detectors 60 designated by the respective reference numerals 60a, 60b, 60c, 60d, 60e, 60f, 60g and 60h. The outputs of the peak detectors 60 each are connected to the monitor network 66.

The outputs of the amplifiers 68 are connected to the peak detectors 76 and eight peak detectors 76 are shown in FIGS. 2I and 2J and designated therein by the respective reference numerals 76a, 76b, 76c, 76d, 76e, 76f, 76g and 76h. The output of the peak detector 76 also is connected to the monitored network 66.

Shown in FIG. 2 are two temperature sensing networks 18 designated in FIG. 2J by the respective reference numerals 18a and 18b. The temperature signals are outputted from two separate temperature probes 90 (not shown in FIG. 2J) over signal path 92, (two signal paths 92 being shown in FIG. 2J and designated by the respective reference numerals 92a and 92b). The temperature signals are inputted into the current to voltage convertor scaler and offset network 94 (two such networks 94 being shown in FIG. 2J and designated therein by the respective reference numerals 94a and 94b. The output of the current to voltage convert scaler and offset network 94a on the signal path 96 is connected to a jumper terminal 124 for connecting either the jumpers 98 or 100 shown in FIG. 1 and described before. The temperature signals outputted by the current to voltage convertor scaler and offset network 94b are outputted over a signal path 96b and connected to a jumper terminal 126. Jumper cables 98 or 100 are connectable to the jumper terminals 124 and 126 in a manner for reasons described before. Thus, two of the eight channels shown in FIG. 2 include temperature sensing networks 18. In the preferred embodiment wherein there are sixteen channels and four of the channels 14 would include temperature sensing networks 18 in the embodiment as shown in FIG. 2.

The eight selected signals outputted by the eight channels 14 shown in FIG. 2 are outputted over respective signal paths 54. Eight signal paths 54 are shown in FIG. 2D and designated therein by the respective reference numerals 54a, 54b, 54c, 54d, 54e, 54f, 54g and 54h.

The following is a summary of some of the components shown in FIG. 2 along with a part number, description and suitable manufacturer. The column designated "Per Board" indicates the number of each component required for the eight channel board shown in FIG. 2.

| PER BOARD | PART NUMBER | DESCRIPTION | MANU-FACTURER |
|---|---|---|---|
| 2 | 74AHCT245 | 8 bit transceiver | Samsung |
| 1 | 74AHCT154 | 4 to 16 line demultiplexor | Samsung |
| 1 | 74AHCT521 | 8 bit comparator | Samsung |
| 1 | 74AHCT00 | Quad NAND | Samsung |
| 3 | 74AHCT273 | 8 bit register with clear | Samsung |
| 1 | AD581 | 10 V voltage reference | AD |
| 1 | XR8038 | Precision Waveform Generator | EXAR |
| 1 | AD707 | Low offset op-amp | AD |
| 8 | AD7512 | Dual SPDT switch | AD |
| 17 | AD708 | Low offset dual op-amp | AD |
| 2 | AD396 | Quad 14-bit DAC | AD |
| 8 | INA102 | Instrumentation Amplifier | Burr-Brown |
| 8 | INA105 | Instrumentation Amplifier | Burr-Brown |
| 4 | SN75477 | Dual peripheral driver | TI (Allied) |
| 1 | AD580 | 2.5 V Voltage Reference | AD |
| 8 | GILC05 | SPDT IC Style Relay | GI Clare (Allied) |
| 1 | ARE-8-10K | 8 position DIP with 10k pull-ups | ALCO Switch (Newark) |
| 1 | DC1515D5 | 5 v to plus/minus 15 V DC to DC | Conversion |
| 10 | | 100k, 20 turn pot | Any |
| 1 | | 50k, 20 turn pot | Any |
| 1 | | 20k, 20 turn pot | Any |
| 10 | | 5k, 20 turn pot | Any |
| 2 | | 1k, 20 turn pot | Any |
| 1 | | 10k, 1%, ⅛ w resistor | Any |
| 16 | | 1.0M, 1%, ⅛ w resistor | Any |
| 16 | | 2.0M, 1%, ⅛ w resistor | Any |
| 8 | | 5.000 R, .01% resistor or | IRC MAR40 |
| 16 | | 10.000 R, .01% resistor | IRC MAR40 |
| 2 | | 8.60k, 1%, ⅛ w resistor | Any |
| 16 | | 100k, 1%, ⅛ w resistor | Any |
| 2 | | 7.87k, 1%, ⅛ w resistor | Any |
| 2 | | 97.6k, 1%, ⅛ w resistor | Any |
| 1 | | 81k, 1%, ⅛ w resistor | Any |
| 32 | IN4148 | Diodes | Any |
| 2 | | .100" 3 post headers | Any |
| 2 | | 2.2 uf Tantalum, 35 V capacitors | Any |
| 20 | | 10.2 uf Tantalum, capacitor | Any |
| 84 | | .1 uf ceramic capacitor | Any |
| 8 | 100 uH | Epoxy Conformal Inductor | J. W. Miller (Digikey) |
| 1 | | 50 pin (2 × 25) male right angle header connector, PCB mount | |
| 1 | | 50 pin (2 × 25) male straight angle header connector with mounting ears (example = T&B Ansley 622-5016), IDC ribbon cable termination | |
| 1 | | 50 pin (2 × 25) ribbon cable to PCB transition connector (example = T&B Ansley 622-5053) | |
| 1 | | IBM-AT I/O Bracket for 50 pin header-Globe Manufacturing Sales, Inc. (#626) | |

The processor 12 includes the general purpose digital computer 103 and its power supply 105 and the general purpose digital computer 103 may be an IBM PC/XT/AT or compatible type processor in one preferred embodiment each channel 14 is selectively setable to output a selected DC or AC voltage or DC or AC current signal and each output can be set to either DC (zero to 10 volts or zero to 2 mA) or 60 Hz AC (zero to plus/minus 10 volts or zero to plus/minus 2 mA).

The processor 12 is programmed so that the operator can turn each channel 14 ON and OFF at pre-programmed time intervals. While the channel 14 is operating, the voltage and current (DC or ACP) are constantly monitored by the monitor network 66. The processor 12 is programmed so that the operator can set separate upper and lower alarm limits for each channel to alert the operator of any error conditions if the monitored voltage or current exceeds the upper or lower alarm limits. The processor 12 is programmed to output the monitored voltages and currents continuously and these values continuously are displayed by the display 88. These monitored voltages and currents also can be outputted on the printer 84 in a printed format. The monitored voltages and currents also can be stored in the processor 12 at any desirable interval such as ten seconds or greater for example.

Once the user has programmed the processor 12 to output the selected signals on each of the channels 14 with upper and lower alarm limits and with separate or individual turn ON and turn OFF times and with separate time intervals for printing, such setups and programs may be stored in the processor 28 for later retrieval and use.

In the setup mode, the type of output (DC current or voltage or AC current or voltage) for each channel 14 is inputted into the processor 12 along with the amplitude with each voltage or current selected signal and the alarm limits for use with each channel 14. If a particular channel 14 is not required in a particular operation of the programmable power supply 10, the operator can input instructions into the processor 12 causing the processor 12 to output a switch signal on the signal path 38 for causing the switch 32 to connect the signal path 34 to ground thereby deactivating that particular channel at least with respect to outputting selected signals.

The processor 12 is programmed to have a manual mode which permits the operator to turn ON and OFF all active channels 14. When ON, the active channels 14 are monitored via the display 88. These monitored values also can be periodically outputted to the printer 84 or to storage in the processor 12.

The processor 12 also has a program mode which automates the manual mode by allowing a program file to be created or loaded. The program file contains a sequential list of elapsed times and channel ON/OFF states. Once started, the channels 14 then are automatically turned ON and OFF at the times specified in the program file. As with the manual mode, the active channels 14 are continuously monitored via the display 88 and can be periodically outputted to the printer 84 or stored in the processor 12. The program files can be created and edited with a change program command inputted into the processor 12 and the program files can be outputted on a disk by the processor 12 for future use.

The following a summary describing the general operation of one program for effecting the operation of the programmable power supply 10 constructed in accordance with the present invention and adapted to be use with the processor 12.

In the following general program description the word "Scepter" appears several times and the word "Scepter" was used in the program merely refer to a particular programmable power supply 10.

STARTING SCEPTER

After turning on the computer, use the DOS "cd" Command to change the path to "C/scepter/". Type "SCEPTER" to hit return. SCEPTER's Main Menu will appear.

MAIN MENU

The SCEPTER main menu presents five choices, each selected with a function key.

F1 selects "Setup", where the SCEPTER channels are configured. Normally, this choice will always be selected when first entering the program.

F3 selects "Program Mode", where a program file is used to turn ON and OFF the SCEPTER channels at pre-specified times. In addition, this section is where program files are loaded, saved, created and edited.

F5 selects "Manual Mode", where the SCEPTER channels can be turned ON and OFF manually.

F9 selects "Utilities". Currently, no utilities are included in the SCEPTER software package.

F10 selects DOS. This key causes an exit from SCEPTER and returns user to DOS.

Where entering SETUP, the computer display is configured to resemble the face of a physical laboratory power supply. The first nine channel configurations are shown. Hitting "OTHER SCREEN" (F9) causes the display to show the configuration of channels 10-18. Each press of "OTHER SCREEN" (F9) causes the display to toggle between the two instrument screens. Hitting "LIMITS" (F8) causes the OUTPUT block of each channel to be replaced with the current upper and lower limits for that channel. As with "OTHER SCREEN" (F9), each press of F8 causes the channel displays to toggle between showing OUTPUT and LIMITS. "MAIN" (F10) returns user to the SCEPTER main menu.

Channels which are not active have blank instrument faces. When SETUP is entered for the first time, all channels will be inactive and all the channel instrument faces will be blank. User can activate the channels user wishes to use by loading a Setup file which user have previously created or by creating a new setup from scratch. User may also load a Setup file, then change it to suit user's current requirements.

SETUP - LOAD SETUP

Hitting "LOAD SETUP" (F4) in the Setup menu causes the file name prompt to appear: Input name of setup to load (no path or extension): Type in the name of the Setup file user wishes to load (up to eight characters) and press Enter. The Setup file you specified will be loaded and the proper channels activated. If user does not remember the name of the Setup file user wanted to use, hit "VIEW FILES" (F1) to see a list of all the Setup files stored on the disk. If user decides not to load a file, hit "ESCAPE" or "EXIT" (F10). Note that all Setup files are stored in the c:SCEPTERset directory with extension ".set," so no paths or extensions will be allowed when user enter your file name.

SETUP - SAVE SETUP

Hitting "SAVE SETUP" (F5) in the Setup Menu causes the current setup to be saved to disk. The following prompt will appear: Input name of setup to save (no path or extension): Type in the name user wishes to save the current setup with an press "ENTER". If that name has already been used, user will be asked if user wishes to overwrite the old setup file. Note that all Setup files are stored in the c:SCEPTER/set directory with extension ".set", so no paths or extensions should be entered as part of the file name. If user decides not to save the Setup, hit "ESCAPE" or "EXIT" (F10).

SETUP - CHANGE SETUP

Hitting "CHANGE SETUP" (F3) in the Setup Menu allows user to activate and deactivate channels and to adjust user's parameters. If a Setup file has previously been loaded or created, user can change it.

When changing a setup, it is usually easiest to first activate and deactivate the channels to suit user's requirements. It is easy to see which channels are active—their instrument faces are filled in. Deactivated channels have blank instrument faces.

In order to speed creation and editing of Setup files, more than one channel, if desired, may be changed at once. User will see the prompt: Select channel(s) to change: Hit "SINGLE" (F1) and user will be asked to supply the channel number. When a valid number is entered, the Channel Label for that channel will turn to reverse video, signifying that the channel is "selected" and that future changes will affect that channel. Hit "ALL ACTIVE" and each active channel will be likewise "selected" for future changes. In similar fashion, "#1–#9," (F3) "#10–#18" (F4) and "ALL" (F5) are used to "select" certain groups of channels.

Once a channel or group of channels has been selected, user may modify the parameters of the group. The only key that will affect a deactivate (blank) channel is "Activate" (F1). Thus, when creating a setup, it is usually easiest to activate/deactivate the desired channels, then change their other parameters. Note that user cannot activate a channel for which hardware is not present.

Each of the selected channels can be altered for voltage (V) or current (I) output and for AC or DC. Hit "MORE . . . " (F7) to see the additional function keys for entering voltage or current setpoints and alarm limits.

The channel(s) user has selected remain selected until user hit "FINISHED . . ." (F10). This allows user to perform all the needed changes to the selected channel or group of channels before moving on to the next channel or group of channels.

MANUAL MODE

Hitting "MANUAL MODE" (F5) in the SCEPTER Main Menu will allow user to turn on all of the SCEPTER channels which are active in the current setup (which has been previously loaded or created in the Setup section). The channels will remain on until user hits "STOP" (Alt--F10). The voltage and current outputs of each channel are monitored continuously and shown on the screen. Outputs which exceed the alarm limits will flash. If user then hits "LIMITS" (F8), the limits which are being violated (upper or lower) will be flashing. The elapsed time since the active channels were turned on will displayed in the upper righthand corner.

The monitored voltages and currents from each active channel can be output to the printer or to a disk file at a specified time interval (as often as every 10 seconds). When user hits "RUN (active)" to start, user will be asked if user wishes to monitor outputs to the printer and/or disk. If user answers "YES" to either question, user will be asked to specify a time interval. If user requests a disk data file, user will be asked to supply a file name to use. If that file already exits, user will be asked if it is all right to overwrite it. Note that all extension disk data files are stored in the "c:/data" directory with ".prn," so no path or extension should be used when entering the file name.

The disk data files produced by SCEPTER are ASCII text files which are direct images of what the printer output looks like. any line print program (e.g. Norton's "LP") or the DOS "Print" command can be used to print these disk files if additional handcopies are desired. User may use the "IMPORT" command in Lotus 1-2-3 to load this file into a spreadsheet for statistical analysis.

At the beginning of each printer and/or disk data file, a header is printed which shows the time and date and prints the setup being used. As the outputs are printed, inactive channels are left blank and outputs which exceed their alarm limits are preceded with an asterisk.

PROGRAM MODE

Program Mode is similar to Manual mode, but the ON/OFF state of each channel is controlled by a Program File. "Run (active)" (F1) is almost identical to the Run (active) of Manual Mode, except that a Program file must have first been loaded or created. when "Run (active)" (F1) is selected. SCEPTER checks to be sue that a valid Program file is present. The user is then prompted for printer and file data output as in MANUAL Mode - Run (active). SCEPTER then turns on the active channels as controlled by the first event line in the Program file. Elapsed time since start is shown in the upper righthand corner of the screen. After each event in the Program file is executed, the next event to be performed is displayed above the function key area.

SCEPTER continues to operate in this fashion, automatically processing subsequent events as their elapsed times are reached. All channels are switched to OFF when the next to last event (the one before the "99:99:99 . . ." termination event marker) has been executed or the user terminates prematurely by hitting STOP (Alt-F10).

"Load Prog" (F4) and "Save Prog" (F5) work just like "Load Setup" and "Save Setup" in the Setup section.

PROGRAM FILES

Program files are simple ASCII files which consist of several lines, or "events". An "event" consists of an elapsed time (HH:MM:SS) and a list of 18 codes, one for each possible SCEPTER channel as shown:

| CODE | MEANING |
|------|---------|
| −1 | Not Active |
| 0 | OFF |
| 1 | ON |

Thus, a typical event line might look like this:

00:01:30 1 1 0 0 −1 −1 −1 −1 −1 −1 −1 −1 −1
−1 −1 −1 −1 −1

This means, "At an elapsed time of 1 minute 30 seconds, turn channels 1 and 2 ON and channels 3 and 4 OFF (channels 5-18 are inactive)." A program file can have up to 256 separate events. The first and last lines of a Program file have special significance. The first line can have any combination of channel codes, but must have an elapsed time of "00:00:00". The last line is always: "99:99:99" −1 −1 −1 −1 −1 −1 −1 −1 −1 −1 −1 −1 −1 −1 −1 −1 −1; This tells the SCEPTER program that the Program is complete and to turn off all channels. Since this shutdown is executed immediately after the next to the last event line, channels turned ON by the next to the last event will almost instantly be turned back OFF. It is therefore wise to have the next to the last event switch all channels to their OFF state (0).

Note that, while setup files and Program files are separate and use different format, a Program file and a Setup file which are to be used together must have the same active channels. User will not be allowed to load or create a Program file which uses different active channels than the concurrently loaded Setup file.

PROGRAM MODE - CHANGE PROG

"Change Prog" (F3) lets the user create a new program or edit a loaded one. The user may also use "Change Prog" to verify that the Program file user wants use has been loaded or to simply remind user of the contents of the Program file (browsing). When user hit "CHANGE PROG", the normal instrument face screen is replaced with the Program editing window. The column headings are displayed across the top, and currently active channel columns are indicated by up arrow along the bottom. The highlight bar is controlled by the up and down arrow keys, and is used for some of the editing functions. The "Home" and "End" keys move user to the first and last event lines, respectively. The "Page Up" and "Page Down" keys move you 10 lines up or down, respectively.

If no Program file has been previously loaded when "Change Prog" is selected, you will see only the "00:00:00 . . ." and "99:99:99 . . ." event lines.

Inactive channels are indicated by −1 codes and cannot be edited.

PROGRAM MODE - CHANGE PROG - CHANGE EVENT

"Change Event" (F1) allows user to toggle the state of one or more active channels of a specific event. User will be asked for the "event time" of the event user wishes to change. If you have already moved the highlight bar to that event, its time will appear at the prompt and user can just hit Enter. If not, just enter the even time from the keyboard, then press Enter. User will then be asked whether user would like to change a single channel or all active channels. If user hits "Single" (F1), user will be asked for the channel number. The state of the selected channel(s) will then be toggled (0 [off] changes to 1 [on], 1 [on]changes to 0 [off]) at the event time user specified.

PROGRAM MODE - CHANGE PROG - ADD EVENT

"Add event" (F2) allows user to add a new event line to the Program file. Enter a new event time at the prompt and a new event like will be added at the proper spot in the program file with all active channels set to 0 (off) and all inactive channels set to −1. User cannot add an event time which already exists. After adding an event, use "Change Event" to edit the state of any or all of the channels, if necessary.

PROGRAM MODE - CHANGE PROG - DELETE EVENT

"Delete Vent" (F3) allows you to delete a existing event line. Enter an existing even time at the prompt and that event will disappear. If user highlights the line user wishes to delete before hitting "Delete event" (F3), the prompt will already be filled in and user needs only hit Enter to delete that line.

PROGRAM MODE - CHANGE PROG - COPY CHANNEL

"Copy channel" (F4) allows user to copy one channel's ON/OFF states to another channel. If user wanted the first four channels of an eight active channel setup to follow the same program, it would be easiest to setup channel 1 properly, using "Change Event--Single", then copy channel 1 to the other 3 channels.

Copy channel asks for a source (from) channel number and a destination (to) channel number. the destination channel states are then updated to match those of the source channel.

The SCEPTER software is designed to be installed on a hard disk and uses preset directories for storage of needed files. This greatly simplifies file loading and saving the SCEPTER program. Since paths and extensions are automatically added by the program, the user need only enter root file names.

A hard disk with properly installed SCEPTER software will contain the following directories and files.

| Path: | c/scepter/ | |
|---|---|---|
| Files: | scepter.exe | The SCEPTER program |
| | instr1A.scr | Display screen file-loaded automatically as needed by SCEPTER |
| | instr2A.scr | Display screen file-loaded automatically as needed by SCEPTER |
| | instr1B.scr | Display screen file-loaded automatically as need by SCEPTER |
| | instr2B.scr | Display screen file-loaded automatically as needed by SCEPTER |
| | header.scr | Display screen file-loaded automatically as needed by SCEPTER |
| | keys.scr | Display screen file-loaded automatically as needed by SCEPTER |
| | hardware.cnf | ASCII file which is read by SCEPTER | to determine what SCEPTER hardware is present (See appendix B)
Path: c/data/
Files: All of the disk data files are stored by SCEPTER in this directory with extension ".prn"
Path: c:/scepter/set
Files: All of the Setup files are stored by SCEPTER in this directory with extension ".set"
Path: c/scepter/pgm
Files: All of the Program files are stored by SCEPTER in this directory with extension ".pgm"

Appendix B

SCEPTER Software File Formats

This file tells SCEPTER what hardware is available, and where each channel can be found in the PC I/O space. the file is stored as an ASCII text file and always has 18 lines, one for each channel, in order from 1 to 18. Each line contains three numbers separated by commas. The first is the base I/O address of the SCEPTER card the channel is located on. The second one is the base I/O address of the Data Translation 2801 card linked with the channel. The third is the position on the card (1–8) to be assigned to the channel. Part of hardware.Cnf file is shown below:

```
512,768,1
512,768,2
512,768,3
512,768,4
       .
       .
       .
```

This indicates that channel 1 is to use the first output of the SCEPTER card at address 512, which is linked to a DT card at address 768. Channel 2 is to use the second output of the SCEPTER card at address 512 (again with DT card at 768) and so on.

One very important note involves changing and editing of Hardware.Cnf. The first eight lines (corresponding to channels 1 to 8) must utilize identical SCEPTER and DT card addresses, and these must be different from those used with the first eight. Likewise, the last two channels must utilize identical SCEPTER and DT card addresses.

The requirement arises because channels 1–8 of SCEPTER must utilize the 8 circuits on one SCEPTER/DT card set. channels 9–16 must also be mapped to one SCEPTER/DT card set. Within a set (1–8, 9–16 or 17–18), the positions may be assigned in whatever order user wishes.

.SET FILES

.SET files are ASCII text files which tell SCEPTER how to configure each channel. The .set file has 18 lines, one for channels 1 to 18 sequentially. Each line contains seven parameters, separated by commas. Their meanings are as follows:

| Parameter 1 = active status | (0 = deactivated, 1 = activated) |
|---|---|
| Parameter 2 = ON/OFF status | (0 = Off, 1 = ON) |
| Parameter 3 = Volt/Current status | (0 = Voltage, 1 = Current) |
| Parameter 4 = AC/DC status | (0 = DC, 1 = AC) |
| Parameter 5 = Setting | (in volts or milliamps, per parameter, #3) |
| Parameter 6 = Lower Limit | (in volts or milliamps, per parameter #5) |
| Parameter 7 = Upper Limit | (in volts or milliamps, per parameter #5) |

.PGM Files

.PGM files are ASCII text files which contain an ordered list of event items and associated channel states (0=OFF, 1=ON, and −1=deactivated). This format consists of the elapsed event time in double quotes, a comma, and 18 channel states, also separated by commas. This format is very similar to the one used by the SCEPTER program in "Change Program". Additional details concerning this field can be found in the "Change Program" description in this manual.

The following is a program listing for effecting the program generally just described. This program is adapted to be used with another program named "Software Library (Quickpak Professional)" available from Crescent Software, Stanford, Conn.

```
'*********************************************************************
'*
    *
'*    Program:     SCEPTER
    *
'*    Module:      MAIN.BAS
    *
'*
    *
'*    Programmer:  Craig Housworth for Aslan Design
    *
'*    Date:        5/20/89
    *
'*    Revision:    A
    *
'*
    *
'*    Notes:
    *
'*********************************************************************

DECLARE SUB textin (T$, Max%, NumOnly%, CapsOn%, exitcode%, Colr%)
DECLARE SUB emptypgm ()
DECLARE SUB PGMtoStrings ()
DECLARE SUB eventchange (hilight%)
DECLARE SUB eventadd (hilight%)
DECLARE SUB eventdelete (hilight%)
DECLARE SUB copychannel ()
DECLARE SUB eventdisplay (eventcounter%)
DECLARE SUB OutputPGMList (num%)
DECLARE SUB event (eventcounter%)
DECLARE SUB ShowNextEvent (eventcounter%)
DECLARE SUB PgmRun (screenflag%, limitflag%)
DECLARE SUB ChangePgm (screenflag%, limitflag%)
DECLARE SUB LoadPgm (screenflag%, limitflag%)
DECLARE SUB SavePgm ()
DECLARE SUB errorwait (a$)
DECLARE SUB Setup ()
DECLARE SUB derror ()
DECLARE SUB perror ()
DECLARE SUB SetAlarms ()
DECLARE SUB OutputHeader (fileoutputnum%)
DECLARE SUB DiskPrinterUpdate (diskoutnum%, printoutnum%, ElapsedTime&)
DECLARE SUB DiskPrinterOutput (diskoutnum%, printoutnum%)
DECLARE SUB ShowOutputs (screenflag%, limitflag%)
DECLARE SUB monitoractive (screenflag%, limitflag%)
DECLARE SUB GetDTvalue (i%)
DECLARE SUB AllActiveOn ()
DECLARE SUB AllActiveOff ()
DECLARE SUB getfkey2 (fcode%)
```

```
DECLARE SUB ManualRun (screenflag%, limitflag%)
DECLARE SUB ShowElapsedTime (ElapsedTime&)
DECLARE SUB BuildByte (i%, VorIRegister%, ACorDCRegister%)
DECLARE SUB OutputSCEPTERStatus ()
DECLARE SUB SetSetting (i%)
DECLARE SUB SaveSetupFile ()
DECLARE SUB LoadSetupFile (screenflag%, limitflag%)
DECLARE SUB NumIn (n#, Max%, Places%, exitcode%, Colr%)
DECLARE SUB MakeChanges (screenflag%)
DECLARE SUB displayselection (screenflag%)
DECLARE SUB ChangeSetup (page%, limitmode%)
DECLARE SUB MsgBox (message$, Wdth%, Cnf AS ANY)
DECLARE SUB Clearsection (position%)
DECLARE SUB GetFKey (fcode%)
DECLARE SUB ManualMode ()
DECLARE SUB ProgramMode ()
DECLARE SUB Utilities ()
DECLARE SUB fillkeys ()
DECLARE SUB MainScreen ()
DECLARE SUB ReadHardwareConfig ()
DECLARE SUB initialize ()
DECLARE SUB displaystatus (page%, limitmode%)

DECLARE FUNCTION Exist% (filename$)
DECLARE FUNCTION Num2Time$ (n&)
DECLARE FUNCTION Time2Num& (T$)
DECLARE FUNCTION Date2Num% (d$)
DECLARE FUNCTION Value2Volts# (Value%)
DECLARE FUNCTION Value2Amps# (Value%)
DECLARE FUNCTION PRNReady% (lpt%)
DECLARE FUNCTION checktime% (in$)

DEFINT A-Z
' $INCLUDE: 'c:\qb\scepter\datadef.inc'
' $INCLUDE: 'DefCnf.BI'
' $INCLUDE: 'Setcnf.BI'

DIM SHARED status(1 TO 18) AS statusstructure
DIM SHARED Channel(1 TO 18) AS hardwarefile
DIM SHARED outputs(1 TO 18) AS outform DIM SHARED Keylabel(1 TO 10) AS STRING * 12
DIM SHARED header%(1 TO 241)
DIM SHARED keys%(1 TO 241)
DIM SHARED HSamplesV(1 TO 50)
DIM SHARED LSamplesv(1 TO 50)
DIM SHARED HSamplesI(1 TO 50)
DIM SHARED LSamplesI(1 TO 50)
DIM SHARED Instr1a%(1 TO 1281)
DIM SHARED Instr2a%(1 TO 1281)
DIM SHARED Instr1b%(1 TO 1281)
DIM SHARED Instr2b%(1 TO 1281)
DIM SHARED Selected(1 TO 18) AS INTEGER
DIM SHARED openerror%, printererror%
DIM SHARED diskflag%, printflag%, outputinterval&
DIM SHARED SetUpFlag%, pgmflag%
DIM SHARED currentoffset#
DIM SHARED eventtime$(0 TO 255)
DIM SHARED eventcondition%(0 TO 255, 1 TO 18)
DIM SHARED maxevent%
DIM SHARED pgmarray$(300)
```

```
'Start of Main Program Loop
CALL initialize

DO
    CALL MainScreen

Keylabel(1) = "Setup"
    Keylabel(2) = " "
    Keylabel(3) = "Program Mode"
    Keylabel(4) = " "
    Keylabel(5) = "Manual Mode"
    Keylabel(6) = " "
    Keylabel(7) = " "
    Keylabel(8) = " "
    Keylabel(9) = "Utilities"
    Keylabel(10) = "DOS"

CALL fillkeys

CALL GetFKey(fcode%)
    SELECT CASE fcode%
        CASE 1
            CALL Setup
        CASE 3
            CALL ProgramMode
        CASE 5
            CALL ManualMode
        CASE 9
            CALL Utilities
        CASE 10
            GOTO EndMain
        CASE ELSE
            CALL chime(6)
    END SELECT
LOOP EndMain:
CLS
END fileerror:
    openerror% = -1
    RESUME NEXT printerror:
    printererror% = -1
    RESUME NEXT SUB AllActiveOff OUT Channel(1).ScepterCardBase + 32, 0
OUT Channel(9).ScepterCardBase + 32, 0
OUT Channel(17).ScepterCardBase + 32, 0

FOR i% = 1 TO 18
    IF status(i%).Active = 1 THEN
        status(i%).OnOff = 0
    END IF
NEXT i%

END SUB

SUB AllActiveOn
```

```
OnOffRegister% = 0
FOR i% = 1 TO 8
    IF status(i%).Active = 1 THEN
        OnOffRegister% = OnOffRegister% + (2 ^ (Channel(i%).Position-
OnCard - 1))
    END IF
    status(i%).OnOff = 1
NEXT i%

OUT (Channel(1).ScepterCardBase + 32), OnOffRegister%

OnOffRegister% = 0
FOR i% = 9 TO 16
    IF status(i%).Active = 1 THEN
        OnOffRegister% = OnOffRegister% + (2 ^ (Channel(i%).Position-
OnCard - 1))
    END IF
    status(i%).OnOff = 1
NEXT i%

OUT (Channel(9).ScepterCardBase + 32), OnOffRegister%

OnOffRegister% = 0
FOR i% = 17 TO 18
    IF status(i%).Active = 1 THEN
        OnOffRegister% = OnOffRegister% + (2 ^ (Channel(i%).Position-
OnCard - 1))
    END IF
    status(i%).OnOff = 1
NEXT i%

OUT (Channel(17).ScepterCardBase + 32), OnOffRegister%

END SUB

SUB BuildByte (i%, VorIRegister%, ACorDCRegister%)

IF status(i%).Active = 1 THEN
    IF status(i%).VorI = 1 THEN
        VorIRegister% = VorIRegister% + (2 ^ (Channel(i%).Position-
OnCard - 1))
    END IF
    IF status(i%).ACorDC = 1 THEN
        ACorDCRegister% = ACorDCRegister% + (2 ^ (Channel(i%).Position-
OnCard - 1))
    END IF
END IF

END SUB

SUB ChangePgm (screenflag%, limitflag%)

IF pgmflag% = 0 THEN
    CALL emptypgm
END IF

CALL PGMtoStrings

Keylabel(1) = "Change event"
Keylabel(2) = "Add event "
Keylabel(3) = "Delete event"
```

```
Keylabel(4) = "Copy channel"
Keylabel(5) = " "
Keylabel(6) = " "
Keylabel(7) = " "
Keylabel(8) = " "
Keylabel(9) = " "
Keylabel(10) = "Finished..."

CALL fillkeys

CALL ClearScr0(6, 1, 21, 80, 7)
CALL box0(6, 6, 21, 74, 1, 7)
LOCATE 7, 8
CALL qprint0(" Time          1  2  3  4  5  6  7  8  9 10 11 12 13 14 15 16 17 18", 7)
LOCATE 8, 8
CALL qprint0(STRING$(65, CHR$(196)), 7)
LOCATE 19, 8
CALL qprint0(STRING$(65, CHR$(196)), 7)
LOCATE 20, 8
act$ = " Active:       "
FOR T% = 1 TO 18
   IF status(T%).Active = 1 THEN
      act$ = act$ + CHR$(24) + "  "
   ELSE
      act$ = act$ + "   "
   END IF
NEXT T%
CALL qprint0(act$, 7)

hilight% = 0
firstline% = 0

DO

LOCATE 4
   CALL qprint0(STRING$(80, " "), 7)
   LOCATE 4, 26
   CALL qprint0("PROGRAM MODE - Change Program", 7)

LOCATE 9, 8
   CALL APrint0(BYVAL VARPTR(pgmarray$(firstline%)), 10, 1, 65, 7)
   LOCATE 9 + hilight% - firstline%, 8
   CALL APrint0(BYVAL VARPTR(pgmarray$(hilight%)), 1, 1, 65, 112)

DO
         x$ = INKEY$
      LOOP UNTIL LEN(x$)

SELECT CASE x$
         CASE CHR$(0) + CHR$(68)  'F10 - Finished
            EXIT SUB
         CASE CHR$(0) + CHR$(80)   'Down arrow
            IF hilight% < maxevent% THEN
               hilight% = hilight% + 1
            END IF IF hilight% > firstline% + 9 THEN
               firstline% = firstline% + 1
            END IF
         CASE CHR$(0) + CHR$(72)   'Up arrow
            IF hilight% > 0 THEN
```

```
            hilight% = hilight% - 1
            IF firstline% > hilight% THEN
                firstline% = firstline% - 1
            END IF
        END IF CASE CHR$(0) + CHR$(71)   'Home
        firstline% = 0
        hilight% = 0

CASE CHR$(0) + CHR$(79)   'End
        firstline% = maxevent% - 9
        IF firstline% < 0 THEN firstline% = 0
        hilight% = maxevent%
    CASE CHR$(0) + CHR$(73)   'Page Up
        firstline% = firstline% - 9
        IF firstline% < 0 THEN firstline% = 0
        hilight% = firstline%
    CASE CHR$(0) + CHR$(81)   'Page Down
        firstline% = firstline% + 9
        IF firstline% > maxevent% - 9 THEN firstline% = maxevent%
                                                              - 9
        IF firstline% < 0 THEN firstline% = 0
        hilight% = firstline%
    CASE CHR$(0) + CHR$(59)   'F1
        CALL eventchange(hilight%)
        firstline% = hilight% - 4
        IF firstline% < 0 THEN firstline% = 0
        CALL PGMtoStrings
        IF maxevent% > 1 THEN
            pgmflag% = 1
        ELSE
            pgmflag% = 0
        END IF
    CASE CHR$(0) + CHR$(60)   'F2
        CALL eventadd(hilight%)
        firstline% = hilight% - 4
        IF firstline% < 0 THEN firstline% = 0
        CALL PGMtoStrings
        IF maxevent% > 1 THEN
            pgmflag% = 1
        ELSE
            pgmflag% = 0
        END IF
    CASE CHR$(0) + CHR$(61)   'F3
        CALL eventdelete(hilight%)
        firstline% = hilight% - 4
        IF firstline% < 0 THEN firstline% = 0
        CALL PGMtoStrings
        IF maxevent% > 1 THEN
            pgmflag% = 1
        ELSE
            pgmflag% = 0
        END IF
    CASE CHR$(0) + CHR$(62)   'F4
        CALL copychannel
        CALL PGMtoStrings
        IF maxevent% > 1 THEN
            pgmflag% = 1
        ELSE
            pgmflag% = 0
        END IF
    CASE ELSE
```

```
                    CALL chime(6)
        END SELECT

LOOP

END SUB

SUB ChangeSetup (screenflag%, limitflag%)

FOR i% = 1 TO 18
    Selected(i%) = 0
NEXT i%

DO

LOCATE 4, 1: CALL qprint0(STRING$(80, " "), 7)
LOCATE 4, 30: CALL qprint0("SETUP - Change Setup", 7)

CALL displaystatus(screenflag%, 1)

LOCATE 22, 1
CALL qprint0(STRING$(80, " "), 7)
LOCATE 22, 4
CALL qprint0("Select channel(s) to change:", 7)

first:
Keylabel(1)  = "Single          "
Keylabel(2)  = "All Active      "
Keylabel(3)  = "#1 - #9         "
Keylabel(4)  = "#10 - #18       "
Keylabel(5)  = "All             "
Keylabel(6)  = "                "
Keylabel(7)  = "                "
Keylabel(8)  = "                "
Keylabel(9)  = "Other Screen"
Keylabel(10) = "Finished..."

CALL fillkeys

CALL GetFKey(fcode%)
    selectcode% = fcode%
    SELECT CASE fcode%
        CASE 1
            FOR i% = 1 TO 18
                Selected(i%) = 0
            NEXT i%
            DO
                LOCATE 22, 1
                CALL qprint0(STRING$(80, " "), 7)
                LOCATE 22, 1
                CALL qprint0("Enter channel number: ", 7)

tempstr$ = "1 "
                CALL editor(tempstr$, actlength%, scancode%, 1, 0, 7, 7, 22, 26)
                IF scancode% = 27 THEN GOTO EndChangeSetUp
                i% = VAL(tempstr$)
                IF i% < 1 OR i% > 18 THEN CALL chime(6)
            LOOP UNTIL i% >= 1 AND i% <= 18

Selected(i%) = 1
            LOCATE 22, 1: CALL qprint0(STRING$(80, " "), 7)
```

```
        IF i% < 10 THEN
            screenflag% = 1
        ELSE
            screenflag% = 2
        END IF
        CALL displaystatus(screenflag%, 1)
        CALL displayselection(screenflag%)
        CALL MakeChanges(screenflag%)

CASE 2
        FOR i% = 1 TO 18
            Selected(i%) = 0
            IF status(i%).Active = 1 THEN
                Selected(i%) = 1
            END IF
        NEXT i%
        CALL displaystatus(screenflag%, 1)
        CALL displayselection(screenflag%)
        CALL MakeChanges(screenflag%)

CASE 3
        FOR i% = 1 TO 18
            Selected(i%) = 0
        NEXT i%
        FOR i% = 1 TO 9
            Selected(i%) = 1
        NEXT i%
        screenflag% = 1
        CALL displaystatus(screenflag%, 1)
        CALL displayselection(screenflag%)
        CALL MakeChanges(screenflag%)

CASE 4
        FOR i% = 1 TO 18
            Selected(i%) = 0
        NEXT i%
        FOR i% = 10 TO 18
            Selected(i%) = 1
        NEXT i%
        screenflag% = 2
        CALL displaystatus(screenflag%, 1)
        CALL displayselection(screenflag%)
        CALL MakeChanges(screenflag%)

CASE 5
        FOR i% = 1 TO 18
            Selected(i%) = 1
        NEXT i%
        CALL displaystatus(screenflag%, 1)
        CALL displayselection(screenflag%)
        CALL MakeChanges(screenflag%)

CASE 9
        IF screenflag% = 1 THEN
            screenflag% = 2
        ELSE
            screenflag% = 1
        END IF CALL displaystatus(screenflag%, 1)
        CALL displayselection(screenflag%)
```

```
            CASE 10
                LOCATE 22, 1
                CALL qprint0(STRING$(80, " "), 7)
                GOTO EndChangeSetUp
            CASE ELSE
                CALL chime(6)
        END SELECT
LOOP EndChangeSetUp:
LOCATE 22, 1
CALL qprint0(STRING$(80, " "), 7)

END SUB

FUNCTION checktime% (in$)

FOR i% = 1 TO 8
    IF i% = 3 OR i% = 6 THEN
        IF MID$(in$, i%, 1) <> ":" THEN
            checktime% = 1
            EXIT FUNCTION
        END IF
    ELSEIF MID$(in$, i%, 1) > "9" OR MID$(in$, i%, 1) < "0" THEN
        checktime% = 1
        EXIT FUNCTION
    END IF
NEXT i%
    IF VAL(MID$(in$, 1, 2)) > 99 THEN
        checktime% = 1
        EXIT FUNCTION
    END IF IF VAL(MID$(in$, 4, 2)) > 59 THEN
        checktime% = 1
        EXIT FUNCTION
    END IF IF VAL(MID$(in$, 7, 2)) > 59 THEN
        checktime% = 1
        EXIT FUNCTION
    END IF checktime% = 0

END FUNCTION

SUB Clearsection (position%)

CALL ClearScr0(10, 8 * position% - 3, 13, 8 * position% + 3, 7)
CALL ClearScr0(15, 8 * position% - 3, 16, 8 * position% + 3, 7)
CALL ClearScr0(18, 8 * position% - 3, 20, 8 * position% + 3, 7)
END SUB SUB copychannel LOCATE 4, 1
CALL qprint0(STRING$(80, " "), 7)
LOCATE 4, 18
CALL qprint0("PROGRAM MODE - Change Program - Copy Channel", 7)

Keylabel(1) = " "
    Keylabel(2) = " "
```

```
      Keylabel(3) = " "
      Keylabel(4) = " "
      Keylabel(5) = " "
      Keylabel(6) = " "
      Keylabel(7) = " "
      Keylabel(8) = " "
      Keylabel(9) = " "
      Keylabel(10) = " "

CALL fillkeys

GetFromChannel:
DO
    LOCATE 22, 1
    CALL qprint0(STRING$(80, " "), 7)
    LOCATE 22, 4
    CALL qprint0("Enter source channel number:", 7)

tempstr$ = "1 "
    CALL editor(tempstr$, actlength%, scancode%, 1, 0, 7, 7, 22, 34)
    IF scancode% = 27 THEN GOTO ExitCopyChannel FromChan% = VAL(tempstr$)

IF FromChan% < 1 OR FromChan% > 18 THEN CALL chime(6)

LOOP UNTIL FromChan% >= 1 AND FromChan% <= 18

IF status(FromChan%).Active = 0 THEN
    message$ = "That channel is not active in the current SETUP.  Hit
any key to continue..."
    CALL errorwait(message$)
    GOTO GetFromChannel
END IF GetToChannel:
DO
    LOCATE 22, 1
    CALL qprint0(STRING$(80, " "), 7)
    LOCATE 22, 4
    CALL qprint0("Enter destination channel number:", 7)

tempstr$ = "1 "
    CALL editor(tempstr$, actlength%, scancode%, 1, 0, 7, 7, 22, 39)
    IF scancode% = 27 THEN GOTO ExitCopyChannel ToChan% = VAL(tempstr$)

IF ToChan% < 1 OR ToChan% > 18 THEN CALL chime(6)

LOOP UNTIL ToChan% >= 1 AND ToChan% <= 18

IF status(ToChan%).Active = 0 THEN
    message$ = "That channel is not active in the current SETUP.  Hit
any key to continue..."
    CALL errorwait(message$)
    GOTO GetToChannel
END IF 'Now do the copy
FOR i% = 0 TO maxevent% - 1
    eventcondition%(i%, ToChan%) = eventcondition%(i%, FromChan%)
NEXT i%
```

```
ExitCopyChannel:
    'Restore previous keys
Keylabel(1) = "Change event"
Keylabel(2) = "Add event "
Keylabel(3) = "Delete event"
Keylabel(4) = "Copy channel"
Keylabel(5) = " "
Keylabel(6) = " "
Keylabel(7) = " "
Keylabel(8) = " "
Keylabel(9) = " "
Keylabel(10) = "Finished..."

CALL fillkeys

LOCATE 22, 1
CALL qprint0(STRING$(80, " "), 7)

END SUB

SUB derror message$ = "Error in writing to disk."
LOCATE 10
CALL MsgBox(message$, 40, Cnf)
CALL pause(10)
CALL MsgBox("", 40, Cnf)

diskflag% = 0

END SUB

SUB DiskPrinterOutput (diskoutnum%, printoutnum%)

LOCATE 22, 1
CALL qprint0(STRING$(80, " "), 7)

printflag% = 0
diskflag% = 0
printoutnum% = 0
diskoutnum% = 0

'Printer?
GetPRN:
Mess$ = "Monitor Outputs to printer? (Y or N) "
yn$ = "N"
CALL YesNo(yn$, Mess$, scancode%, 7, 7, 22, 4)
LOCATE 22, 1
CALL qprint0(STRING$(80, " "), 7)

IF yn$ = "Y" THEN
    LOCATE 22, 1
    CALL qprint0(STRING$(80, " "), 7)
    LOCATE 22, 4
    CALL qprint0("Checking Printer. Please wait...", 7)
IF PRNReady%(1) = -1 THEN
    printoutnum% = FREEFILE
    OPEN "LPT1:" FOR OUTPUT AS #printoutnum%
    printflag% = 1

ELSE
    message$ = "Printer is not ready. Hit any key to continue..."
```

```
        CALL errorwait(message$)
        GOTO GetPRN
    END IF

LOCATE 22, 1
    CALL qprint0(STRING$(80, " "), 7)

END IF

'DiskFile?
getdsk:
Mess$ = "Monitor Outputs to disk file? (Y or N) "
yn$ = "N"
CALL YesNo(yn$, Mess$, scancode%, 7, 7, 22, 4)
LOCATE 22, 1
CALL qprint0(STRING$(80, " "), 7)

IF yn$ = "Y" THEN
    LOCATE 22, 1
    CALL qprint0(STRING$(80, " "), 7)
    LOCATE 22, 4 diskoutnum% = FREEFILE
    ON ERROR GOTO fileerror

Tryagain:
    openerror% = 0
    LOCATE 22, 1
    CALL qprint0(STRING$(80, " "), 7)
    LOCATE 22, 4
    INPUT "Filename to use (no path or extension): ", a$
    a$ = "c:\data\" + a$ + ".prn"
    there = Exist(a$)
    IF there = -1 THEN
        CALL chime(2)
        CALL chime(4)
        LOCATE 22, 1
        CALL qprint0(STRING$(80, " "), 7)
        message$ = "File already exists. Overwrite it? (Y or N): "
        yn$ = "N"
        CALL YesNo(yn$, message$, scancode%, 7, 7, 22, 4)
        IF yn$ = "n" OR yn$ = "N" THEN GOTO Tryagain
    END IF
        OPEN a$ FOR OUTPUT AS #diskoutnum%

IF openerror% = -1 THEN
            LOCATE 22, 1
            CALL qprint0(STRING$(80, " "), 7)
            message$ = "Bad file name.  Hit any key to continue"
            CALL errorwait(message$)
            openerror% = 0
            GOTO getdsk
        END IF diskflag% = 1
        LOCATE 22, 1
        CALL qprint0(STRING$(80, " "), 7)
        ON ERROR GOTO 0

END IF

'Exit if neither printer or diskfile was selected
IF printflag% = 0 AND diskflag% = 0 THEN EXIT SUB
```

```
'Get Interval
retry:
LOCATE 22, 1
CALL qprint0(STRING$(80, " "), 7)
LOCATE 22, 4
CALL qprint0("Enter the output interval you would like to use (HH:M-
M:SS): ", 7)

tempstr$ = Num2Time(outputinterval&)

CALL editor(tempstr$, actlength%, scancode%, 1, 0, 7, 7, 22, 70)

IF checktime%(tempstr$) = 0 THEN
    outputinterval& = Time2Num(tempstr$)
    IF outputinterval& < 10 THEN
        message$ = "Output interval must be 10 seconds or greater.  Hit
any key to continue..."
        CALL errorwait(message$)
        GOTO retry
    END IF
ELSE
    message$ = "Bad time or time format.  Hit any key to continue..."
    CALL errorwait(message$)
    GOTO retry
END IF LOCATE 22, 1
CALL qprint0(STRING$(80, " "), 7)

END SUB
SUB DiskPrinterUpdate (diskoutnum%, printoutnum%, ElapsedTime&)

format1$ = "##:   ##.## V  ##.## mA    "
format2$ = "##:  *##.## V  ##.## mA    "
format3$ = "##:   ##.## V *##.## mA    "
format4$ = "##:                        "

IF printflag% = 1 THEN

ON ERROR GOTO printerror
    printererror% = 0

PRINT #printoutnum%, Num2Time$(ElapsedTime&)
    IF printererror% = -1 THEN
        CALL perror
        GOTO skiptohere
    END IF FOR i% = 1 TO 18
        IF status(i%).Active = 1 THEN
            IF outputs(i%).alarm = 0 THEN
                format$ = format1$
            ELSE
                IF status(i%).VorI = 0 THEN
                    format$ = format2$
                ELSE
                    format$ = format3$
                END IF
            END IF
            PRINT #printoutnum%, USING format$; i%; outputs(i%).read-
volts; outputs(i%).readamps;
```

```
        IF printerror% = -1 THEN
            CALL perror
            GOTO skiptohere
        END IF ELSE
        PRINT #printoutnum%, USING format4$; i%;
        IF printerror% = -1 THEN
            CALL perror
            GOTO skiptohere
        END IF

END IF

IF i% = 3 OR i% = 6 OR i% = 9 OR i% = 12 OR i% = 15 THEN
        PRINT #printoutnum%, " "
        IF printerror% = -1 THEN
            CALL perror
            GOTO skiptohere
            END IF
        END IF NEXT i%

PRINT #printoutnum%, " "
    IF printerror% = -1 THEN
        CALL perror
        GOTO skiptohere
    END IF
    PRINT #printoutnum%, " "
    IF printerror% = -1 THEN
        CALL perror
        GOTO skiptohere
    END IF

END IF

ON ERROR GOTO 0 skiptohere:
IF diskflag% = 1 THEN

ON ERROR GOTO fileerror
    openerror% = 0

PRINT #diskoutnum%, Num2Time$(ElapsedTime&)
    IF openerror% = -1 THEN
        CALL derror
        GOTO LastStop
    END IF FOR i% = 1 TO 18
        IF status(i%).Active = 1 THEN
            IF outputs(i%).alarm = 0 THEN
                format$ = format1$
            ELSE
                IF status(i%).VorI = 0 THEN
                    format$ = format2$
                ELSE
                    format$ = format3$
                END IF
            END IF
```

```
            PRINT #diskoutnum%, USING format$; i%; outputs(i%).read-
volts; outputs(i%).readamps;
            IF openerror% = -1 THEN
                CALL derror
                GOTO LastStop
            END IF ELSE
                PRINT #diskoutnum%, USING format4$; i%;
                IF openerror% = -1 THEN
                    CALL derror
                    GOTO LastStop
                END IF

END IF

IF i% = 3 OR i% = 6 OR i% = 9 OR i% = 12 OR i% = 15 THEN
                PRINT #diskoutnum%, " "
                IF openerror% = -1 THEN
                    CALL derror
                    GOTO LastStop
                END IF
            END IF NEXT i%

PRINT #diskoutnum%, " "
        IF openerror% = -1 THEN
            CALL derror
            GOTO LastStop
        END IF
        PRINT #diskoutnum%, " "
        IF openerror% = -1 THEN
            CALL derror
            GOTO LastStop
        END IF

END IF

LastStop:
    ON ERROR GOTO 0

END SUB

SUB displayselection (screenflag%)

IF screenflag% = 1 THEN
    FOR i% = 1 TO 9
        IF Selected(i%) = 1 THEN
            CALL PaintBox0(7, 8 * i% - 3, 8, 8 * i% + 3, 112)
        ELSE
            CALL PaintBox0(7, 8 * i% - 3, 8, 8 * i% + 3, 7)
        END IF
    NEXT i%
ELSE
    FOR i% = 1 TO 9
        IF Selected(i% + 9) = 1 THEN
            CALL PaintBox0(7, 8 * i% - 3, 8, 8 * i% + 3, 112)
        ELSE
```

```
              CALL PaintBox0(7, 8 * i% - 3, 8, 8 * i% + 3, 7)
          END IF
      NEXT i%
  END IF

END SUB

DEFSNG A-Z
  SUB displaystatus (page%, limitmode%)
  IF page% = 1 THEN
      startpos% = 0
  ELSE
      startpos% = 9
  END IF 'Show proper instrument face
  IF (page% = 1 AND limitmode% = 0) THEN
      CALL scrnrest0(6, 1, 21, 80, SEG Instr1a%(1))
      FOR i% = 1 TO 9
          IF status(i% + startpos%).Active = 0 THEN
              CALL Clearsection(i%)
          END IF
      NEXT i%
  ELSEIF (page% = 1 AND limitmode% = 1) THEN
      CALL scrnrest0(6, 1, 21, 80, SEG Instr1b%(1))
      FOR i% = 1 TO 9
          IF status(i% + startpos%).Active = 0 THEN
              CALL Clearsection(i%)
          END IF
      NEXT i%
  ELSEIF (page% = 2 AND limitmode% = 0) THEN
      CALL scrnrest0(6, 1, 21, 80, SEG Instr2a%(1))
      FOR i% = 1 TO 9
          IF status(i% + startpos%).Active = 0 THEN
              CALL Clearsection(i%)
          END IF
      NEXT i%
  ELSEIF (page% = 2 AND limitmode% = 1) THEN
      CALL scrnrest0(6, 1, 21, 80, SEG Instr2b%(1))
      FOR i% = 1 TO 9
          IF status(i% + startpos%).Active = 0 THEN
              CALL Clearsection(i%)
          END IF
      NEXT i%
  END IF 'For active channels, highlight selections
  FOR i% = 1 TO 9
      IF status(i% + startpos%).Active = 1 THEN
          IF status(i% + startpos%).OnOff = 0 THEN
              CALL PaintBox0(11, 8 * i% + 1, 11, 8 * i% + 3, 112)
  ELSE
      CALL PaintBox0(11, 8 * i% - 3, 11, 8 * i% - 2, 112)
  END IF IF status(i% + startpos%).VorI = 0 THEN
      CALL PaintBox0(12, 8 * i% - 3, 12, 8 * i% - 3, 112)
  ELSE
      CALL PaintBox0(12, 8 * i% + 1, 12, 8 * i% + 1, 112)
  END IF IF status(i% + startpos%).ACorDC = 0 THEN
```

```
            CALL PaintBox0(13, 8 * i% + 1, 13, 8 * i% + 2, 112)
        ELSE
            CALL PaintBox0(13, 8 * i% - 3, 13, 8 * i% - 2, 112)
        END IF IF status(i% + startpos%).VorI = 0 THEN
            CALL pusing(STR$(status(i% + startpos%).setting), "##.## V",
112, 112, 0, 16, 8 * i% - 3)
        ELSE
            CALL pusing(STR$(status(i% + startpos%).setting), "##.## m",
112, 112, 0, 16, 8 * i% - 3)
        END IF IF limitmode% = 1 THEN
            IF outputs(i% + startpos%).alarm = 1 THEN
                UColor% = 240
                LColor% = 112
            ELSEIF outputs(i% + startpos%).alarm = -1 THEN
                UColor% = 112
                LColor% = 240
            ELSE
                UColor% = 112
                LColor% = 112
            END IF IF status(i% + startpos%).VorI = 0 THEN
                CALL pusing(STR$(status(i% + startpos%).ULimit), "##.##
V", 112, 112, 0, 19, 8 * i% - 3)
                CALL pusing(STR$(status(i% + startpos%).LLimit), "##.##
V", 112, 112, 0, 20, 8 * i% - 3)
            ELSE
                CALL pusing(STR$(status(i% + startpos%).ULimit), "##.##
m", 112, 112, 0, 19, 8 * i% - 3)
                CALL pusing(STR$(status(i% + startpos%).LLimit), "##.##
m", 112, 112, 0, 20, 8 * i% - 3)
            END IF
        END IF
    END IF NEXT i%
    END SUB DEFINT A-Z
    SUB emptypgm FOR T% = 0 TO 300
        pgmarray$(T%) = " "
    NEXT T% maxevent% = 1
    eventtime$(0) = "00:00:00"
    eventtime$(1) = "99:99:99"
    FOR z% = 1 TO 18
        IF status(z%).Active = 1 THEN
            eventcondition%(0, z%) = 1
            eventcondition%(1, z%) = -1
        ELSE
            eventcondition%(0, z%) = -1
            eventcondition%(1, z%) = -1
        END IF
    NEXT z%

END SUB
```

```
SUB errorwait (a$)

LOCATE 10
    CALL MsgBox(a$, 40, Cnf)
    CALL chime(6)
    CALL waitkey
    CALL MsgBox("", 40, Cnf)

END SUB

SUB event (eventcounter%)

OnOffRegister% = 0
FOR i% = 1 TO 8
    IF status(i%).Active = 1 AND eventcondition%(eventcounter%, i%) =
1 THEN
        OnOffRegister% = OnOffRegister% + (2 ^ (Channel(i%).Position-
OnCard - 1))
        status(i%).OnOff = 1
    ELSE
        status(i%).OnOff = 0
    END IF
NEXT i%

OUT (Channel(1).ScepterCardBase + 32), OnOffRegister%

OnOffRegister% = 0
FOR i% = 9 TO 16
    IF status(i%).Active = 1 AND eventcondition%(eventcounter%, i%) =
1 THEN
        OnOffRegister% = OnOffRegister% + (2 ^ (Channel(i%).Position-
OnCard - 1))
        status(i%).OnOff = 1
    ELSE
        status(i%).OnOff = 0
    END IF
NEXT i%

OUT (Channel(9).ScepterCardBase + 32), OnOffRegister%

OnOffRegister% = 0
FOR i% = 17 TO 18
    IF status(i%).Active = 1 AND eventcondition%(eventcounter%, i%) =
1 THEN
        OnOffRegister% = OnOffRegister% + (2 ^ (Channel(i%).Position-
OnCard - 1))
        status(i%).OnOff = 1
    ELSE
        status(i%).OnOff = 0
    END IF
NEXT i%

OUT (Channel(17).ScepterCardBase + 32), OnOffRegister%

END SUB

SUB eventadd (hilight%)

LOCATE 4, 1
CALL qprint0(STRING$(80, " "), 7)
LOCATE 4, 20
CALL qprint0("PROGRAM MODE - Change Program - Add Event", 7)
```

```
        Keylabel(1) = "."
        Keylabel(2) = " "
        Keylabel(3) = " "
        Keylabel(4) = " "
        Keylabel(5) = " "
        Keylabel(6) = " "
        Keylabel(7) = " "
        Keylabel(8) = " "
        Keylabel(9) = " "
        Keylabel(10) = " "

CALL fillkeys again1:
LOCATE 22, 1
CALL qprint0(STRING$(80, " "), 7)
LOCATE 22, 4
CALL qprint0("Enter the event time to add (HH:MM:SS): ", 7)

tempstr$ = "00:00:00"
CALL editor(tempstr$, actlength%, scancode%, 1, 0, 7, 7, 22, 50)

IF scancode% = 27 THEN GOTO ExitEventAdd
IF scancode% <> 13 THEN
    CALL chime(6)
    GOTO again1
END IF IF checktime%(tempstr$) = 0 THEN
    neweventtime$ = tempstr$
ELSE
    message$ = "Bad time or time format.  Hit any key to continue..."
    CALL errorwait(message$)
    GOTO again1
END IF match% = 0
FOR i% = 0 TO maxevent%
    IF neweventtime$ = eventtime$(i%) THEN
        match% = 1
        EXIT FOR
    END IF
NEXT i%

IF match% = 1 THEN
    message$ = "That event time already exists in this program. Hit any key to continue..."
    CALL errorwait(message$)
    GOTO again1
END IF LOCATE 22, 1
CALL qprint0(STRING$(80, " "), 7)

FOR i% = 0 TO maxevent%
    IF neweventtime$ < eventtime$(i%) THEN EXIT FOR
NEXT i% maxevent% = maxevent% + 1
```

```
FOR z% = maxevent% TO (i% + 1) STEP -1
   eventtime$(z%) = eventtime$(z% - 1)
   FOR T% = 1 TO 18
      eventcondition%(z%, T%) = eventcondition%(z% - 1, T%)
   NEXT T%
NEXT z%
  eventtime$(i%) = neweventtime$
  FOR z% = 1 TO 18
     IF status(z%).Active = 1 THEN
        eventcondition%(i%, z%) = 0
     ELSE
        eventcondition%(i%, z%) = -1
     END IF
  NEXT z% hilight% = i%

ExitEventAdd:
    'Restore previous keys
Keylabel(1) = "Change event"
Keylabel(2) = "Add event "
Keylabel(3) = "Delete event"
Keylabel(4) = "Copy channel"
Keylabel(5) = " "
Keylabel(6) = " "
Keylabel(7) = " "
Keylabel(8) = " "
Keylabel(9) = " "
Keylabel(10) = "Finished..."

CALL fillkeys

LOCATE 22, 1
CALL qprint0(STRING$(80, " "), 7)

END SUB

SUB eventchange (hilight%)

LOCATE 4, 1
CALL qprint0(STRING$(80, " "), 7)
LOCATE 4, 18
CALL qprint0("PROGRAM MODE - Change Program - Change Event", 7)

Keylabel(1) = " "
   Keylabel(2) = " "
   Keylabel(3) = " "
   Keylabel(4) = " "
   Keylabel(5) = " "
   Keylabel(6) = " "
   Keylabel(7) = " "
   Keylabel(8) = " "
   Keylabel(9) = " "
   Keylabel(10) = " "

CALL fillkeys
again3:
LOCATE 22, 1
CALL qprint0(STRING$(80, " "), 7)
LOCATE 22, 4
CALL qprint0("Enter the event time to change (HH:MM:SS): ", 7)
```

```
tempstr$ = eventtime$(hilight%)
CALL editor(tempstr$, actlength%, scancode%, 1, 0, 7, 7, 22, 50)

IF scancode% = 27 THEN GOTO ExitEventChange
IF scancode% <> 13 THEN
    CALL chime(6)
    GOTO again3
END IF IF checktime%(tempstr$) = 1 THEN
    message$ = "Bad time or time format.  Hit any key to continue..."
    CALL errorwait(message$)
    GOTO again3
END IF match% = 0
FOR i% = 0 TO maxevent%
    IF tempstr$ = eventtime$(i%) THEN
        match% = 1
        EXIT FOR
    END IF
NEXT i%

IF match% = 0 THEN
    message$ = "That event time dosen't exist in this program. Hit any
key to continue..."
    CALL errorwait(message$)
    GOTO again3
END IF IF tempstr$ = "99:99:99" THEN
    message$ = "You cannot change event 99:99:99. Hit any key to
continue..."
    CALL errorwait(message$)
    GOTO again3
END IF EventToChange% = i%

LOCATE 22, 1
CALL qprint0(STRING$(80, " "), 7)
LOCATE 22, 4
CALL qprint0("Select channel(s) to change:", 7)

Keylabel(1) = "Single      "
    Keylabel(2) = "All Active  "
    Keylabel(3) = "            "
    Keylabel(4) = "            "
    Keylabel(5) = "  "
    Keylabel(6) = "  "
    Keylabel(7) = "  "
    Keylabel(8) = "  "
    Keylabel(9) = "  "
    Keylabel(10) = "Finished..."

CALL fillkeys

CALL GetFKey(fcode%)
    SELECT CASE fcode%
        CASE 1
GetChannel:
        DO
```

```
            LOCATE 22, 1
            CALL qprint0(STRING$(80, " "), 7)
            LOCATE 22, 4
            CALL qprint0("Enter channel number:", 7)

tempstr$ = "1 "
            CALL editor(tempstr$, actlength%, scancode%, 1, 0, 7, 7,
22, 26)
            IF scancode% = 27 THEN GOTO ExitEventChange
            ChanToUse% = VAL(tempstr$)
            IF ChanToUse% < 1 OR ChanToUse% > 18 THEN CALL chime(6)
        LOOP UNTIL ChanToUse% >= 1 AND ChanToUse% <= 18

IF status(ChanToUse%).Active = 0 THEN
            message$ = "That channel is not active in the current
SETUP.  Hit any key to continue..."
            CALL errorwait(message$)
            GOTO GetChannel
        END IF 'Now toggle the state of that channel
        IF eventcondition%(EventToChange%, ChanToUse%) = 1 THEN
            eventcondition%(EventToChange%, ChanToUse%) = 0
        ELSE
            eventcondition%(EventToChange%, ChanToUse%) = 1
        END IF
    CASE 2
        FOR i% = 1 TO 18
            IF status(i%).Active = 1 THEN
                IF eventcondition%(EventToChange%, i%) = 1 THEN
                    eventcondition%(EventToChange%, i%) = 0
                ELSE
                    eventcondition%(EventToChange%, i%) = 1
                END IF
            END IF
        NEXT i%
    CASE 10
        'Do nothing - just exit
    CASE ELSE
        CALL chime(6)
    END SELECT hilight% = EventToChange%

ExitEventChange:
    'Restore previous keys
Keylabel(1) = "Change event"
Keylabel(2) = "Add event "
Keylabel(3) = "Delete event"
Keylabel(4) = "Copy channel"
Keylabel(5) = " "
Keylabel(6) = " "
Keylabel(7) = " "
Keylabel(8) = " "
Keylabel(9) = " "
Keylabel(10) = "Finished..."

CALL fillkeys

LOCATE 22, 1
CALL qprint0(STRING$(80, " "), 7)
```

```
END SUB

SUB eventdelete (hilight%)

LOCATE 4, 1
CALL qprint0(STRING$(80, " "), 7)
LOCATE 4, 18
CALL qprint0("PROGRAM MODE - Change Program - Delete Event", 7)

Keylabel(1)  = " "
    Keylabel(2)  = " "
    Keylabel(3)  = " "
    Keylabel(4)  = " "
    Keylabel(5)  = " "
    Keylabel(6)  = " "
    Keylabel(7)  = " "
    Keylabel(8)  = " "
    Keylabel(9)  = " "
    Keylabel(10) = " "

CALL fillkeys again2:
 LOCATE 22, 1
 CALL qprint0(STRING$(80, " "), 7)
 LOCATE 22, 4
 CALL qprint0("Enter the event time to delete (HH:MM:SS): ", 7)

tempstr$ = eventtime$(hilight%)
CALL editor(tempstr$, actlength%, scancode%, 1, 0, 7, 7, 22, 50)

IF scancode% = 27 THEN GOTO exiteventdelete

IF checktime%(tempstr$) = 1 THEN
    message$ = "Bad time or time format.  Hit any key to continue..."
    CALL errorwait(message$)
    GOTO again2
END IF match% = 0
FOR i% = 0 TO maxevent%
    IF tempstr$ = eventtime$(i%) THEN
        match% = 1
        EXIT FOR
    END IF
NEXT i%

IF match% = 0 THEN
    message$ = "That event time dosen't exist in this program. Hit any
key to continue..."
    CALL errorwait(message$)
    GOTO again2
END IF IF tempstr$ = "00:00:00" OR tempstr$ = "99:99:99" THEN
    message$ = "You cannot delete event 00:00:00 or event 99:99:99.
Hit any key to continue..."
    CALL errorwait(message$)
    GOTO again2
END IF
```

```
FOR z% = i% TO maxevent% - 1
    eventtime$(z%) = eventtime$(z% + 1)
    FOR T% = 1 TO 18
        eventcondition%(z%, T%) = eventcondition%(z% + 1, T%)
    NEXT T%
NEXT z% maxevent% = maxevent% - 1 hilight% = i% exiteventdelete:
    'Restore previous keys
Keylabel(1) = "Change event"
Keylabel(2) = "Add event "
Keylabel(3) = "Delete event"
Keylabel(4) = "Copy channel"
Keylabel(5) = " "
Keylabel(6) = " "
Keylabel(7) = " "
Keylabel(8) = " "
Keylabel(9) = " "
Keylabel(10) = "Finished..."

CALL fillkeys

LOCATE 22, 1
CALL qprint0(STRING$(80, " "), 7)

END SUB

SUB eventdisplay (eventcounter%)

LOCATE 22, 1
CALL qprint0(STRING$(80, " "), 7)
LOCATE 22, 1
b$ = "Next Event: [" + eventtime$(eventcounter%) + "]"
FOR T% = 1 TO 18
    b$ = b$ + " " + STR$(eventcondition%(eventcounter%, T%))
NEXT T%
CALL qprint0(b$, 7)

END SUB

SUB fillkeys

LOCATE 24, 4:   CALL qprint0(Keylabel(1), 7)
LOCATE 25, 4:   CALL qprint0(Keylabel(2), 7)
LOCATE 24, 20:  CALL qprint0(Keylabel(3), 7)
LOCATE 25, 20:  CALL qprint0(Keylabel(4), 7)
LOCATE 24, 36:  CALL qprint0(Keylabel(5), 7)
LOCATE 25, 36:  CALL qprint0(Keylabel(6), 7)
LOCATE 24, 52:  CALL qprint0(Keylabel(7), 7)
LOCATE 25, 52:  CALL qprint0(Keylabel(8), 7)
LOCATE 24, 68:  CALL qprint0(Keylabel(9), 7)
LOCATE 25, 69:  CALL qprint0(Keylabel(10), 7)

END SUB

SUB GetDTvalue (i%)

BaseAddress = Channel(i%).DTCardBase
```

```
'Set up necessary I/O port locations
CommandRegister = BaseAddress + 1
StatusRegister = BaseAddress + 1
DataRegister = BaseAddress 'Set the needed commands
CommandWait = 4
WriteWait = 2
ReadWait = 5

Cstop = 15
Cclear = 1
Cerror = 2
CADIN = 12

'Stop/Clear the board
statusx = INP(StatusRegister)
OUT CommandRegister, Cstop
Temp = INP(DataRegister)
WAIT StatusRegister, CommandWait
OUT CommandRegister, Cclear 'Send A/D Immediate command
WAIT StatusRegister, CommandWait
OUT CommandRegister, CADIN
WAIT StatusRegister, WriteWait, WriteWait
'Send the gain
OUT DataRegister, 0
WAIT StatusRegister, WriteWait, WriteWait
'Send the voltage monitor channel
OUT DataRegister, (Channel(i%).PositionOnCard * 2) - 2

'Read the results
WAIT StatusRegister, ReadWait
low = INP(DataRegister)
WAIT StatusRegister, ReadWait
high = INP(DataRegister)
Value% = (high * 256) + low outputs(i%).readvolts = Value2Volts#(Value%)

'Send the A/D Immediate command
WAIT StatusRegister, CommandWait
OUT CommandRegister, CADIN
WAIT StatusRegister, WriteWait, WriteWait
'Send the gain
OUT DataRegister, 0
WAIT StatusRegister, WriteWait, WriteWait
'Send the current monitor channel
OUT DataRegister, (Channel(i%).PositionOnCard * 2) - 1

'Get the results
WAIT StatusRegister, ReadWait low = INP(DataRegister)
WAIT StatusRegister, ReadWait
high = INP(DataRegister)
Value% = (high * 256) + low outputs(i%).readamps = Value2Amps#(Value%)

END SUB
```

```
SUB GetFKey (fcode%)
DO
   keyhit$ = INKEY$
   IF keyhit$ <> "" THEN
      IF LEFT$(keyhit$, 1) = CHR$(0) THEN
         scancode% = ASC(RIGHT$(keyhit$, 1))
         IF scancode% < 59 OR scancode% > 68 THEN
            CALL chime(6)
         END IF
      ELSE
         CALL chime(6)
      END IF
   ELSE
      scancode% = 0
   END IF
LOOP UNTIL scancode% >= 59 AND scancode% <= 68
fcode% = scancode% - 58

END SUB

SUB getfkey2 (fcode%)

keyhit$ = INKEY$
   IF keyhit$ <> "" THEN
      IF LEFT$(keyhit$, 1) = CHR$(0) THEN
         scancode% = ASC(RIGHT$(keyhit$, 1))
         IF scancode% = 113 THEN
            fcode% = 13
            EXIT SUB
         END IF
         IF scancode% < 59 OR scancode% > 68 THEN
            CALL chime(6)
         ELSE
            fcode% = scancode% - 58
         END IF
      ELSE
         CALL chime(6)
      END IF
   ELSE
      fcode% = 0
   END IF END SUB
SUB initialize 'Get calibartion constants, if any
currentoffset! = 0
IF COMMAND$ <> "" THEN
   currentoffset! = VAL(COMMAND$)
END IF diskflag% = 0
printflag% = 0
SetUpFlag% = 0
pgmflag% = 0

DEF SEG = VARSEG(header%(1))
BLOAD "c:\scepter\header.scr", VARPTR(header%(1))
DEF SEG = VARSEG(Instr1a%(1))
BLOAD "c:\scepter\instr1a.scr", VARPTR(Instr1a%(1))
DEF SEG = VARSEG(Instr1b%(1))
```

```
    BLOAD "c:\scepter\instr1b.scr", VARPTR(Instr1b%(1))
    DEF SEG = VARSEG(Instr2a%(1))
    BLOAD "c:\scepter\instr2a.scr", VARPTR(Instr2a%(1))
    DEF SEG = VARSEG(Instr2b%(1))
    BLOAD "c:\scepter\instr2b.scr", VARPTR(Instr2b%(1))
    DEF SEG = VARSEG(keys%(1))
    BLOAD "c:\scepter\keys.scr", VARPTR(keys%(1))

CALL ReadHardwareConfig

'Set all status records to default
    FOR i% = 1 TO 18
        status(i%).Active = 0
        status(i%).OnOff = 0
        status(i%).VorI = 0
        status(i%).ACorDC = 0
        status(i%).setting = 0
        status(i%).ULimit = 0
        status(i%).LLimit = 0
        outputs(i%).alarm = 0
    NEXT i% outputinterval& = 60
    CALL emptypgm

END SUB

SUB LoadPgm (screenflag%, limitflag%)
DIM ev%(1 TO 18)

restart2:
    Keylabel(1) = "View files"
    Keylabel(2) = " "
    Keylabel(3) = " "
    Keylabel(4) = " "
    Keylabel(5) = " "
    Keylabel(6) = " "
    Keylabel(7) = " "
    Keylabel(8) = " "
    Keylabel(9) = " "
    Keylabel(10) = "Exit"

CALL fillkeys

LOCATE 22, 1
CALL qprint0(STRING$(80, " "), 7)
LOCATE 22, 4
CALL qprint0("Input name of program to load (no path or extension): ", 7)
LOCATE 22, 59 text$ = " "
CALL textin(text$, 8, 0, 0, exitcode%, 7)
IF exitcode% = 2 OR exitcode% = 4 THEN GOTO exitloadpgm IF exitcode% = 3 THEN
    CLS
    SHELL "dir c:\scepter\pgm\*.pgm /p"
    PRINT : PRINT
    PRINT "Hit any key to continue..."
    CALL waitkey
```

```
        CLS
        CALL scrnrest0(1, 1, 3, 80, SEG header%(1))
        CALL scrnrest0(23, 1, 25, 80, SEG keys%(1))
        CALL displaystatus(screenflag%, limitflag%)
        LOCATE 4, 34
        CALL qprint0("PROGRAM MODE", 7)
        GOTO restart2
    END IF a$ = "c:\scepter\pgm\" + text$ + ".PGM"

there = Exist(a$)
    IF there = -1 THEN
        pgmfilenum% = FREEFILE
        OPEN a$ FOR INPUT AS #pgmfilenum%
        FOR e% = 0 TO 255
            INPUT #pgmfilenum%, eventtime$(e%), ev%(1), ev%(2), ev%(3),
ev%(4), ev%(5), ev%(6), ev%(7), ev%(8), ev%(9), ev%(10), ev%(11),
ev%(12), ev%(13), ev%(14), ev%(15), ev%(16), ev%(17), ev%(18)
            FOR z% = 1 TO 18
                eventcondition%(e%, z%) = ev%(z%)
            NEXT z%
            IF EOF(pgmfilenum) THEN EXIT FOR
            IF eventtime$(e%) = "99:99:99" THEN EXIT FOR
        NEXT e% maxevent% = e%
        CLOSE #pgmfilenum%
        LOCATE 22, 1
        CALL qprint0(STRING$(80, " "), 7)

'Check for pgm files which have errors
        pgmerror% = 0
        pgmflag% = 1
            FOR e% = 0 TO (maxevent% - 1)
                IF checktime%(eventtime$(e%)) = 1 THEN pgmerror% = 1
                FOR z% = 1 TO 18
                    IF NOT (eventcondition%(e%, z%) = 1 OR event-
    condition%(e%, z%) = 0 OR eventcondition%(e%, z%) = -1) THEN
                        pgmerror% = 1
                    END IF
                NEXT z%
            NEXT e%
            IF eventtime$(maxevent%) <> "99:99:99" THEN pgmerror% = 1
            IF eventtime$(0) <> "00:00:00" THEN pgmerror% = 1

IF pgmerror% = 1 THEN
            message$ = "The program file could not be loaded because
    it contains errors. Hit any key to continue..."
                CALL errorwait(message$)
                pgmflag% = 0
                CALL emptypgm
            END IF 'Check against currently loaded SETUP
            compatible% = 0
            FOR i% = 0 TO (maxevent% - 1)
                FOR z% = 1 TO 18
                    IF status(z%).Active = 0 THEN
                        IF eventcondition%(i%, z%) <> -1 THEN
                            compatible% = 1
                        END IF
```

```
            ELSE
                IF eventcondition%(i%, z%) = -1 THEN
                    compatible% = 1
                END IF
            END IF
        NEXT z%
    NEXT i%

IF compatible% = 1 THEN
        message$ = "The program file could not be loaded because
it dosen't match the currently loaded SETUP. Hit any key to continue..."
        CALL errorwait(message$)
        pgmflag% = 0
        CALL emptypgm
    END IF ELSE
    LOCATE 22, 1
    CALL qprint0(STRING$(80, " "), 7)
    message$ = "File was not found.  Hit any key to continue..."
    CALL errorwait(message$)
END IF exitloadpgm:
LOCATE 22, 1
CALL qprint0(STRING$(80, " "), 7)

END SUB

SUB LoadSetupFile (screenflag%, limitflag%)

restart:
    Keylabel(1) = "View files"
    Keylabel(2) = " "
    Keylabel(3) = " "
    Keylabel(4) = " "
    Keylabel(5) = " "
    Keylabel(6) = " "
    Keylabel(7) = " "
    Keylabel(8) = " "
    Keylabel(9) = " "
    Keylabel(10) = "Exit"

CALL fillkeys

LOCATE 22, 1
CALL qprint0(STRING$(80, " "), 7)
LOCATE 22, 4
CALL qprint0("Input name of setup to load (no path or extension): ",
7)
LOCATE 22, 59 text$ = " "
CALL textin(text$, 8, 0, 0, exitcode%, 7)
IF exitcode% = 2 OR exitcode% = 4 THEN GOTO exitloadsetup IF exitcode% = 3 THEN
    CLS
    SHELL "dir c:\scepter\set\*.set /p"
    PRINT : PRINT
```

```
PRINT "Hit any key to continue..."
CALL waitkey
CLS
CALL scrnrest0(1, 1, 3, 80, SEG header%(1))
CALL scrnrest0(23, 1, 25, 80, SEG keys%(1))
    CALL displaystatus(screenflag%, limitflag%)
    LOCATE 4, 38
    CALL qprint0("SETUP", 7)
    GOTO restart
 END IF a$ = "c:\scepter\set\" + text$ + ".SET"
there = Exist(a$)
IF there = -1 THEN
    setfilenum% = FREEFILE
    OPEN a$ FOR INPUT AS #setfilenum%
    FOR i% = 1 TO 18
        INPUT #setfilenum%, status(i%).Active, status(i%).OnOff,
status(i%).VorI, status(i%).ACorDC, status(i%).setting, status(i%).U-
Limit, status(i%).LLimit
    NEXT i%
    CLOSE #setfilenum%
    LOCATE 22, 1
    CALL qprint0(STRING$(80, " "), 7)

'Check for setup files which call a different hardware setup
        harderror% = 0
        FOR i% = 1 TO 18
            IF status(i%).Active = 1 AND Channel(i%).ScepterCardBase
= -1 THEN
                status(i%).Active = 0
                harderror% = 1
            END IF
        NEXT i%

IF harderror% = 1 THEN
            message$ = "One or more channels could not be activated
because the hardware is not available.  Hit any key to continue..."
            CALL errorwait(message$)
        END IF ELSE
   LOCATE 22, 1
   CALL qprint0(STRING$(80, " "), 7)
   message$ = "File was not found.  Hit any key to continue..."
   CALL errorwait(message$)
END IF exitloadsetup:
LOCATE 22, 1
CALL qprint0(STRING$(80, " "), 7)

END SUB

SUB MainScreen
CLS
CALL scrnrest0(1, 1, 3, 80, SEG header%(1))
CALL scrnrest0(23, 1, 25, 80, SEG keys%(1))

LOCATE 4, 36: CALL qprint0("MAIN MENU", 7)
```

```
END SUB

SUB MakeChanges (screenflag%)

LOCATE 4, 1: CALL qprint0(STRING$(80, " "), 7)
    LOCATE 4, 23
    CALL qprint0("SETUP - Change Setup - Make Changes", 7)

LOCATE 22, 1
    CALL qprint0(STRING$(80, " "), 7)

keyset% = 0

DO
    IF keyset% = 0 THEN
        Keylabel(1) = "Activate      "
        Keylabel(2) = "Deactivate    "
        Keylabel(3) = "V             "
        Keylabel(4) = "I             "
        Keylabel(5) = "AC            "
        Keylabel(6) = "DC            "
    ELSE
        Keylabel(1) = "Setting       "
        Keylabel(2) = "Upper Limit   "
        Keylabel(3) = "Lower Limit   "
        Keylabel(4) = "              "
        Keylabel(5) = "              "
        Keylabel(6) = ".             "
    END IF
    Keylabel(7) = "More...       "
    Keylabel(8) = "              "
    Keylabel(9) = "Other Screen"
    Keylabel(10) = "Finished..."

CALL fillkeys
        CALL GetFKey(fcode%)
        SELECT CASE fcode%
            CASE 1 AND keyset% = 0
                harderror% = 0
                FOR i% = 1 TO 18
                    IF Selected(i%) = 1 THEN
                        IF Channel(i%).ScepterCardBase <> -1 THEN
                            status(i%).Active = 1
                        ELSE
                            harderror% = 1
                        END IF
                    END IF
                NEXT i%

IF harderror% = 1 THEN
                    message$ = "One or more of the selected channels could not be activated because the hardware is not available.  Hit any key to continue..."
                    CALL errorwait(message$)
                END IF CALL displaystatus(screenflag%, 1)
                CALL displayselection(screenflag%)

CASE 1 AND keyset% = 1
```

```
              voltchans% = 0
              ampchans% = 0
              FOR i% = 1 TO 18
                  IF Selected(i%) = 1 AND status(i%).Active = 1 THEN
                      IF status(i%).VorI = 0 THEN
                          voltchans% = voltchans% + 1
                      ELSE
                          ampchans% = ampchans% + 1
                      END IF
                  END IF
              NEXT i%

IF voltchans% > 0 THEN
volt:             LOCATE 22, 4
                  CALL qprint0("Enter voltage SETTING to use for all
selected voltage mode channels: ", 7)
                  LOCATE 22, 72
                  numentered# = 0!
                  CALL NumIn(numentered#, 2, 2, exitcode%, 7)

LOCATE 22, 1: CALL qprint0(STRING$(80, " "), 7)

IF numentered# < 0 OR numentered# > 10! THEN
                      message$ = "The number you entered is out of range.
Voltages must be in the range 0.00 volts to 10.00 volts.  Hit any key
to continue..."
                      CALL errorwait(message$)
                      GOTO volt
                  END IF harderror% = 0
                  FOR i% = 1 TO 18
                      IF Selected(i%) = 1 AND status(i%).VorI = 0 THEN
                          IF status(i%).Active = 1 THEN
                              status(i%).setting = CSNG(numentered#)
                          ELSE
                              harderror% = 1
                          END IF
                      END IF
                  NEXT i%

IF harderror% = 1 THEN
                      message$ = "One or more of the selected channels could
not be set because it is not active.  Hit any key to continue.."
                      CALL errorwait(message$)
                  END IF
              END IF IF ampchans% > 0 THEN
Amp:              LOCATE 22, 4
                  CALL qprint0("Enter current SETTING to use for all
selected current mode channels: ", 7)
                  LOCATE 22, 72
                  numentered# = 0!
                  CALL NumIn(numentered#, 2, 2, exitcode%, 7)

LOCATE 22, 1: CALL qprint0(STRING$(80, " "), 7)

IF numentered# < 0 OR numentered# > 2! THEN
                      message$ = "The number you entered is out of range.
Currents must be in the range 0.00 mA to 2.00 mA.  Hit any key to
continue..."
```

```
                CALL errorwait(message$)
                GOTO Amp
            END IF harderror% = 0
            FOR i% = 1 TO 18
                IF Selected(i%) = 1 AND status(i%).VorI = 1 THEN
                    IF status(i%).Active = 1 THEN
                        status(i%).setting = CSNG(numentered#)
                    ELSE
                        harderror% = 1
                    END IF
                END IF
            NEXT i%

IF harderror% = 1 THEN
                message$ = "One or more of the selected channels could
not be set because it is not active.  Hit any key to continue.."
                CALL errorwait(message$)
            END IF
        END IF CALL displaystatus(screenflag%, 1)
        CALL displayselection(screenflag%)
        CALL OutputSCEPTERStatus
        CASE 2 AND keyset% = 0
            FOR i% = 1 TO 18
                IF Selected(i%) = 1 THEN
                    status(i%).Active = 0
                END IF
            NEXT i%

CALL displaystatus(screenflag%, 1)
            CALL displayselection(screenflag%)

CASE 2 AND keyset% = 1
            voltchans% = 0
            ampchans% = 0
            FOR i% = 1 TO 18
                IF Selected(i%) = 1 AND status(i%).Active = 1 THEN
                    IF status(i%).VorI = 0 THEN
                        voltchans% = voltchans% + 1
                    ELSE
                        ampchans% = ampchans% + 1
                    END IF
                END IF
            NEXT i%

IF voltchans% > 0 THEN
volt2:          LOCATE 22, 2
                CALL qprint0("Enter alarm UPPER LIMIT to use for all
selected voltage mode channels: ", 7)
                LOCATE 22, 72
                numentered# = 0!
                CALL NumIn(numentered#, 2, 2, exitcode%, 7)

LOCATE 22, 1: CALL qprint0(STRING$(80, " "), 7)

IF numentered# < 0 OR numentered# > 10! THEN
                    message$ = "The number you entered is out of range.
Voltages must be in the range 0.00 volts to 10.00 volts.  Hit any key
to continue..."
```

```
            CALL errorwait(message$)
            GOTO volt2
        END IF harderror% = 0
        FOR i% = 1 TO 18
            IF Selected(i%) = 1 AND status(i%).VorI = 0 THEN
                IF status(i%).Active = 1 THEN
                    status(i%).ULimit = CSNG(numentered#)
                ELSE
                    harderror% = 1
                END IF
            END IF
        NEXT i%

IF harderror% = 1 THEN
            message$ = "One or more of the selected channels could
not be set because it is not active.  Hit any key to continue.."
            CALL errorwait(message$)
        END IF
    END IF IF ampchans% > 0 THEN
amp2:       LOCATE 22, 2
            CALL qprint0("Enter alarm UPPER LIMIT to use for all
selected current mode channels: ", 7)
            LOCATE 22, 72
            numentered# = 0!
            CALL NumIn(numentered#, 2, 2, exitcode%, 7)

LOCATE 22, 1: CALL qprint0(STRING$(80, " "), 7)

IF numentered# < 0 OR numentered# > 2! THEN
                message$ = "The number you entered is out of range.
Currents must be in the range 0.00 mA to 2.00 mA.  Hit any key to
continue..."
                CALL errorwait(message$)
                GOTO amp2
            END IF harderror% = 0
            FOR i% = 1 TO 18
                IF Selected(i%) = 1 AND status(i%).VorI = 1 THEN
                    IF status(i%).Active = 1 THEN
                        status(i%).ULimit = CSNG(numentered#)
                    ELSE
                        harderror% = 1
                    END IF
                END IF
            NEXT i%

IF harderror% = 1 THEN
                message$ = "One or more of the selected channels could
not be set because it is not active.  Hit any key to continue.."
                CALL errorwait(message$)
            END IF
        END IF CALL displaystatus(screenflag%, 1)
        CALL displayselection(screenflag%)
```

```
            CASE 3 AND keyset% = 0
                harderror% = 0
                FOR i% = 1 TO 18
                    IF Selected(i%) = 1 THEN
                        IF status(i%).Active = 1 THEN
                            IF status(i%).VorI = 1 THEN
                                status(i%).VorI = 0
                                status(i%).setting = 0!
                                status(i%).ULimit = 0!
                                status(i%).LLimit = 0!
                            END IF
                        ELSE
                            harderror% = 1
                        END IF
                    END IF
                NEXT i%

IF harderror% = 1 THEN
                    message$ = "One or more of the selected channels could
not be set because it is not active.  Hit any key to continue..."
                    CALL errorwait(message$)
                END IF CALL displaystatus(screenflag%, 1)
                CALL displayselection(screenflag%)
                CALL OutputSCEPTERStatus CASE 3 AND keyset% = 1
                voltchans% = 0
                ampchans% = 0
                FOR i% = 1 TO 18
                    IF Selected(i%) = 1 AND status(i%).Active = 1 THEN
                        IF status(i%).VorI = 0 THEN
                            voltchans% = voltchans% + 1
                        ELSE
                            ampchans% = ampchans% + 1
                        END IF
                    END IF
                NEXT i%

IF voltchans% > 0 THEN
volt3:              LOCATE 22, 2
                    CALL qprint0("Enter alarm LOWER LIMIT to use for all
selected voltage mode channels: ", 7)
                    LOCATE 22, 72
                    numentered# = 0!
                    CALL NumIn(numentered#, 2, 2, exitcode%, 7)

LOCATE 22, 1: CALL qprint0(STRING$(80, " "), 7)

IF numentered# < 0 OR numentered# > 10! THEN
                        message$ = "The number you entered is out of range.
Voltages must be in the range 0.00 volts to 10.00 volts.  Hit any key
to continue..."
                        CALL errorwait(message$)
                        GOTO volt3
                    END IF harderror% = 0
                    FOR i% = 1 TO 18
                        IF Selected(i%) = 1 AND status(i%).VorI = 0 THEN
```

```
            IF status(i%).Active = 1 THEN
                status(i%).LLimit = CSNG(numentered#)
            ELSE
                harderror% = 1
            END IF
        END IF
    NEXT i%

IF harderror% = 1 THEN
        message$ = "One or more of the selected channels could
not be set because it is not active.  Hit any key to continue.."
        CALL errorwait(message$)
    END IF
END IF IF ampchans% > 0 THEN
amp3:       LOCATE 22, 2
            CALL qprint0("Enter alarm LOWER LIMIT to use for all
selected current mode channels: ", 7)
            LOCATE 22, 72
            numentered# = 0!
            CALL NumIn(numentered#, 2, 2, exitcode%, 7)

LOCATE 22, 1: CALL qprint0(STRING$(80, " "), 7)

IF numentered# < 0 OR numentered# > 2! THEN
                message$ = "The number you entered is out of range.
Currents must be in the range 0.00 mA to 2.00 mA.  Hit any key to
continue..."
                CALL errorwait(message$)
                GOTO amp3
            END IF harderror% = 0
            FOR i% = 1 TO 18
                IF Selected(i%) = 1 AND status(i%).VorI = 1 THEN
                    IF status(i%).Active = 1 THEN
                        status(i%).LLimit = CSNG(numentered#)
                    ELSE
                        harderror% = 1
                    END IF
                END IF
            NEXT i%

IF harderror% = 1 THEN
                message$ = "One or more of the selected channels could
not be set because it is not active.  Hit any key to continue.."
                CALL errorwait(message$)
            END IF
        END IF CALL displaystatus(screenflag%, 1)
        CALL displayselection(screenflag%)

CASE 4 AND keyset% = 0
        harderror% = 0
        FOR i% = 1 TO 18
            IF Selected(i%) = 1 THEN
                IF status(i%).Active = 1 THEN
                    IF status(i%).VorI = 0 THEN
                        status(i%).VorI = 1
```

```
                        status(i%).setting = 0!
                        status(i%).ULimit = 0!
                        status(i%).LLimit = 0!
                    END IF
                ELSE
                    harderror% = 1
                END IF
            END IF
        NEXT i%

IF harderror% = 1 THEN
            message$ = "One or more of the selected channels could
not be set because it is not active.  Hit any key to continue..."
            CALL errorwait(message$)
        END IF CALL displaystatus(screenflag%, 1)
        CALL displayselection(screenflag%)
        CALL OutputSCEPTERStatus CASE 5 AND keyset% = 0
        harderror% = 0
        FOR i% = 1 TO 18
            IF Selected(i%) = 1 THEN
                IF status(i%).Active = 1 THEN
                    status(i%).ACorDC = 1
                ELSE
                    harderror% = 1
                END IF
            END IF
        NEXT i%

IF harderror% = 1 THEN
            message$ = "One or more of the selected channels could
not be set because it is not active.  Hit any key to continue..."
            CALL errorwait(message$)
        END IF CALL displaystatus(screenflag%, 1)
        CALL displayselection(screenflag%)
        CALL OutputSCEPTERStatus CASE 6 AND keyset% = 0
        harderror% = 0
        FOR i% = 1 TO 18
            IF Selected(i%) = 1 THEN
                IF status(i%).Active = 1 THEN
                    status(i%).ACorDC = 0
                ELSE
                    harderror% = 1
                END IF
            END IF
        NEXT i%

IF harderror% = 1 THEN
            message$ = "One or more of the selected channels could
not be set because it is not active.  Hit any key to continue..."
            CALL errorwait(message$)
        END IF CALL displaystatus(screenflag%, 1)
        CALL displayselection(screenflag%)
```

```
            CALL OutputSCEPTERStatus

CASE 7
           IF keyset% = 0 THEN
               keyset% = 1
           ELSE
               keyset% = 0
           END IF CASE 9
           IF screenflag% = 1 THEN
               screenflag% = 2
           ELSE
               screenflag% = 1
           END IF CALL displaystatus(screenflag%, 1)
           CALL displayselection(screenflag%)

CASE 10
           GOTO endmakechanges
        CASE ELSE
           CALL chime(6)
    END SELECT
LOOP
endmakechanges:
END SUB SUB ManualMode limitflag% = 0
screenflag% = 1

'Has a setup been established?
IF SetUpFlag% = 0 THEN
    message$ = "A SETUP must have been loaded or created before MANUAL
MODE can be executed.  Hit any key to continue..."
    CALL errorwait(message$)
    EXIT SUB
END IF

DO

LOCATE 4, 1
CALL qprint0(STRING$(80, " "), 7)
LOCATE 4, 35
CALL qprint0("MANUAL MODE", 7)
'Show current setup status
    CALL displaystatus(screenflag%, limitflag%)

Keylabel(1) = "Run (active)"
    Keylabel(2) = "              "
    Keylabel(3) = "              "
    Keylabel(4) = "              "
    Keylabel(5) = "              "
    Keylabel(6) = "              "
    Keylabel(7) = "              "
    IF limitflag% = 0 THEN
        Keylabel(8) = "Limits        "
    ELSE
        Keylabel(8) = "Output        "
    END IF
```

```
        Keylabel(9) = "Other Screen"
        Keylabel(10) = "MAIN         "

CALL fillkeys

CALL GetFKey(fcode%)
        SELECT CASE fcode%
            CASE 1
                CALL ManualRun(screenflag%, limitflag%)
            CASE 8
                IF limitflag% = 0 THEN
                    limitflag% = 1
                    Keylabel(8) = "Output       "
                ELSE
                    limitflag% = 0
                    Keylabel(8) = "Limits       "
                END IF CASE 9
                IF screenflag% = 1 THEN
                    screenflag% = 2
                ELSE
                    screenflag% = 1
                END IF CASE 10
                GOTO EndManualMode
            CASE ELSE
                CALL chime(6)
        END SELECT
LOOP
EndManualMode:
CLS
END SUB SUB ManualRun (screenflag%, limitflag%)

'Show new keys
    Keylabel(1) = "             "
    Keylabel(2) = "             "
    Keylabel(3) = "             "
    Keylabel(4) = "             "
    Keylabel(5) = "             "
    Keylabel(6) = "             "
    Keylabel(7) = "             "
    IF limitflag% = 0 THEN
        Keylabel(8) = "Limits       "
    ELSE
        Keylabel(8) = "Output       "
    END IF
    Keylabel(9) = "Other Screen"
    Keylabel(10) = "Stop         "

CALL fillkeys

'Get output monitioring parameters
CALL DiskPrinterOutput(diskoutnum%, printoutnum%)

IF diskflag% = 1 THEN
    CALL OutputHeader(diskoutnum%)
```

```
END IF

IF printflag% = 1 THEN
    CALL OutputHeader(printoutnum%)
END IF

'Start all active channels
    LOCATE 4, 1
    CALL qprint0(STRING$(80, " "), 7)
    LOCATE 4, 30
    CALL qprint0("MANUAL MODE - Running", 7)

CALL AllActiveOn
    CALL displaystatus(screenflag%, limitflag%)

ElapsedTime& = 0
        Lastoutput& = 0
        StartTime& = Time2Num&(TIME$)
        StartDate% = Date2Num%(DATE$)
        LastTime& = StartTime&
        LastDate% = StartDate%

DO
            CurrentTime& = Time2Num&(TIME$)
            DeltaTime& = CurrentTime& - LastTime&
            IF DeltaTime& <> 0 THEN
                LastTime& = CurrentTime&
                ElapsedTime& = ElapsedTime& + 1
                CALL ShowElapsedTime(ElapsedTime&)
                CALL monitoractive(screenflag%, limitflag%)
            END IF IF (ElapsedTime& - Lastoutput&) >= outputinterval& THEN
                CALL DiskPrinterUpdate(diskoutnum%, printoutnum%,
ElapsedTime&)
                Lastoutput& = ElapsedTime&
            END IF CALL getfkey2(fcode%)
            SELECT CASE fcode%
                CASE 0
                    'Do Nothing - no key was hit CASE 8
                    IF limitflag% = 0 THEN
                        limitflag% = 1
                        Keylabel(8) = "Output      "
                        CALL fillkeys
                    ELSE
                        limitflag% = 0
                        Keylabel(8) = "Limits      "
                        CALL fillkeys
                    END IF
                    CALL displaystatus(screenflag%, limitflag%)
                    CALL monitoractive(screenflag%, limitflag%)
                CASE 9
                    IF screenflag% = 1 THEN
                        screenflag% = 2
                    ELSE
                        screenflag% = 1
```

```
                END IF

CALL displaystatus(screenflag%, limitflag%)
                CALL monitoractive(screenflag%, limitflag%)

CASE 13
                CALL AllActiveOff
                IF printflag% = 1 THEN
                   CLOSE #printoutnum%
                END IF
                IF diskflag% = 1 THEN
                   CLOSE #diskoutnum%
                END IF
                EXIT SUB
             CASE ELSE
                CALL chime(6)
          END SELECT
       LOOP

END SUB

SUB monitoractive (screenflag%, limitflag%)

FOR i% = 1 TO 18
    IF status(i%).Active = 1 THEN
        CALL GetDTvalue(i%)
'       CALL GetDTPeakValue(i%)
    END IF
NEXT i%

CALL SetAlarms
CALL ShowOutputs(screenflag%, limitflag%)

END SUB

SUB OutputHeader (fileoutputnum%)

PRINT #fileoutputnum%, STRING$(78, "*")
PRINT #fileoutputnum%, "*"; TAB(78); "*"
PRINT #fileoutputnum%, "*   SCEPTER Data File"; TAB(78); "*"
PRINT #fileoutputnum%, "*"; TAB(78); "*"
PRINT #fileoutputnum%, "*   Date: "; DATE$; TAB(78); "*"
PRINT #fileoutputnum%, "*   Time: "; TIME$; TAB(78); "*"
PRINT #fileoutputnum%, "*"; TAB(78); "*"
PRINT #fileoutputnum%, STRING$(78, "*")
PRINT #fileoutputnum%, "*"; TAB(78); "*"
PRINT #fileoutputnum%, "*   SETUP being used for this run:"; TAB(78); "*"
PRINT #fileoutputnum%, "*"; TAB(78); "*"
PRINT #fileoutputnum%, "*   Channel  Mode     Type  Setting   Lower Alarm  Upper Alarm"; TAB(78); "*"
PRINT #fileoutputnum%, "*   =======  ====     ====  =======  ===========  ==========="; TAB(78); "*"
PRINT #fileoutputnum%, "*"; TAB(78); "*"

formatchan$ = "*      ##     "
formatvolt$ = "Volts    "
formatamp$  = "Current  "
formatDC$   = "DC   "
formatAC$   = "AC   "
formatsettingV$ = "##.## V      ##.## V       ##.## V"
formatsettingA$ = "##.## m      ##.## m       ##.## m"
```

```
    formatNA$ = "[Not Active]"

FOR i% = 1 TO 18
       PRINT #fileoutputnum%, USING formatchan$; i%;
       IF status(i%).Active = 0 THEN
          PRINT #fileoutputnum%, formatNA$;
       ELSE
          IF status(i%).VorI = 0 THEN
             PRINT #fileoutputnum%, formatvolt$;
          ELSE
             PRINT #fileoutputnum%, formatamp$;
          END IF
          IF status(i%).ACorDC = 0 THEN
             PRINT #fileoutputnum%, formatDC$;
          ELSE
             PRINT #fileoutputnum%, formatAC$;
          END IF
          IF status(i%).VorI = 0 THEN
             PRINT #fileoutputnum%, USING formatsettingV$; status(i%).se-
tting; status(i%).LLimit; status(i%).ULimit;
          ELSE
             PRINT #fileoutputnum%, USING formatsettingA$; status(i%).se-
tting; status(i%).LLimit; status(i%).ULimit;
          END IF
       END IF
       PRINT #fileoutputnum%, TAB(78); "*"
    NEXT i%

PRINT #fileoutputnum%, "*"; TAB(78); "*"
    PRINT #fileoutputnum%, STRING$(78, "*")
    PRINT #fileoutputnum%, " "
    PRINT #fileoutputnum%, " "

END SUB

SUB OutputPGMList (num%)
    formattime$ = "*   &  "
    formatstate$ = "  ##"

PRINT #num%, STRING$(78, "*")
    PRINT #num%, "*"; TAB(78); "*"
    PRINT #num%, "*  PROGRAM being used for this run:"; TAB(78); "*"
    PRINT #num%, "*   (0=Off, 1=On, -1=Not Active)"; TAB(78); "*"
    PRINT #num%, "*"; TAB(78); "*"
    PRINT #num%, "* Time        1  2  3  4  5  6  7  8  9 10 11 12 13 14
 15 16 17 18"; TAB(78); "*"
    PRINT #num%, "*  ====      == == == == == == == == == == == == == ==
 == == == =="; TAB(78); "*"
    PRINT #num%, "*"; TAB(78); "*"

FOR i% = 0 TO maxevent%
       PRINT #num%, USING formattime$; eventtime$(i%);
       FOR z% = 1 TO 18
          PRINT #num%, USING formatstate$; eventcondition%(i%, z%);
       NEXT z%
       PRINT #num%, TAB(78); "*"
    NEXT i%

PRINT #num%, "*"; TAB(78); "*"
    PRINT #num%, STRING$(78, "*")
    PRINT #num%, ""
    PRINT #num%, ""
```

```
END SUB

SUB OutputSCEPTERStatus

FOR i% = 1 TO 18
    IF status(i%).Active = 1 THEN
        CALL SetSetting(i%)
    END IF
NEXT i%

'Output control bytes for group 1
VorIRegister% = 0: ACorDCRegister% = 0
FOR i% = 1 TO 8
    CALL BuildByte(i%, VorIRegister%, ACorDCRegister%)
NEXT i%

OUT (Channel(1).ScepterCardBase + 36), ACorDCRegister%
OUT (Channel(1).ScepterCardBase + 40), VorIRegister%

'Output control bytes for group 2
VorIRegister% = 0: ACorDCRegister% = 0
FOR i% = 9 TO 16
    CALL BuildByte(i%, VorIRegister%, ACorDCRegister%)
NEXT i%
OUT (Channel(9).ScepterCardBase + 36), ACorDCRegister%
OUT (Channel(9).ScepterCardBase + 40), VorIRegister%

'Output control bytes for group 3
VorIRegister% = 0: ACorDCRegister% = 0
FOR i% = 17 TO 18
    CALL BuildByte(i%, VorIRegister%, ACorDCRegister%)
NEXT i%
OUT (Channel(17).ScepterCardBase + 36), ACorDCRegister%
OUT (Channel(17).ScepterCardBase + 40), VorIRegister%

END SUB

SUB perror message$ = "Printer is not responding."
LOCATE 10
CALL MsgBox(message$, 40, Cnf)
CALL pause(10)
CALL MsgBox("", 40, Cnf)
printflag% = 0

END SUB

SUB PgmRun (screenflag%, limitflag%)
'Show new keys
Keylabel(1) = "                "
Keylabel(2) = "                "
Keylabel(3) = "                "
Keylabel(4) = "                "
Keylabel(5) = "                "
Keylabel(6) = "                "
Keylabel(7) = "                "
IF limitflag% = 0 THEN
    Keylabel(8) = "Limits          "
ELSE
```

```
    Keylabel(8) = "Output       "
END IF
Keylabel(9) = "Other Screen"
Keylabel(10) = "Stop         "

CALL fillkeys

'Get output monitioring parameters
CALL DiskPrinterOutput(diskoutnum%, printoutnum%)

IF diskflag% = 1 THEN
   CALL OutputHeader(diskoutnum%)
   CALL OutputPGMList(diskoutnum%)
END IF IF printflag% = 1 THEN
   CALL OutputHeader(printoutnum%)
   CALL OutputPGMList(printoutnum%)
END IF LOCATE 4, 1
   CALL qprint0(STRING$(80, " "), 7)
   LOCATE 4, 30
   CALL qprint0("PROGRAM MODE - Running", 7)

CALL displaystatus(screenflag%, limitflag%)

ElapsedTime& = 0
        Lastoutput& = 0
        StartTime& = Time2Num&(TIME$)
        StartDate% = Date2Num%(DATE$)
        LastTime& = StartTime&
        LastDate% = StartDate%

CALL event(eventcounter%)
        eventcounter% = eventcounter% + 1
        CALL eventdisplay(eventcounter%)
        CALL displaystatus(screenflag%, limitflag%)

DO
           CurrentTime& = Time2Num&(TIME$)
           DeltaTime& = CurrentTime& - LastTime&
           IF DeltaTime& <> 0 THEN
              LastTime& = CurrentTime&
              ElapsedTime& = ElapsedTime& + 1
              CALL ShowElapsedTime(ElapsedTime&)
              CALL monitoractive(screenflag%, limitflag%)
           END IF.

'See if we need to execute the next event
           IF ElapsedTime& >= Time2Num(eventtime$(eventcounter%))
THEN
              CALL event(eventcounter%)
              eventcounter% = eventcounter% + 1
              CALL eventdisplay(eventcounter%)
              CALL displaystatus(screenflag%, limitflag%)
              IF eventtime$(eventcounter%) = "99:99:99" THEN EXIT DO
           END IF
```

```
                'See if we need to send monitored outputs to disk/printer
                IF (ElapsedTime& - Lastoutput&) >= outputinterval& THEN
                    CALL DiskPrinterUpdate(diskoutnum%, printoutnum%,
ElapsedTime&)
                    Lastoutput& = ElapsedTime&
                END IF CALL getfkey2(fcode%)
                SELECT CASE fcode%
                    CASE 0
                        'Do Nothing - no key was hit CASE 8
                        IF limitflag% = 0 THEN
                            limitflag% = 1
                            Keylabel(8) = "Output       "
                            CALL fillkeys
                        ELSE
                            limitflag% = 0
                            Keylabel(8) = "Limits       "
                            CALL fillkeys
                        END IF
                        CALL displaystatus(screenflag%, limitflag%)
                        CALL monitoractive(screenflag%, limitflag%)

CASE 9
                        IF screenflag% = 1 THEN
                            screenflag% = 2
                        ELSE
                            screenflag% = 1
                        END IF CALL displaystatus(screenflag%, limitflag%)
                        CALL monitoractive(screenflag%, limitflag%)

'CASE 10
                    CASE 13
                        IF printflag% = 1 THEN
                            CLOSE #printoutnum%
                        END IF
                        IF diskflag% = 1 THEN
                            CLOSE #diskoutnum%
                        END IF
                        EXIT DO
                    CASE ELSE
                        CALL chime(6)
                END SELECT
LOOP CALL AllActiveOff
LOCATE 22, 1
CALL qprint0(STRING$(80, " "), 7)

END SUB
SUB PGMtoStrings

FOR i% = 0 TO 300
    pgmarray$(i%) = " "
NEXT i%
```

```
    FOR i% = 0 TO maxevent%
        pgmarray$(i%) = " " + eventtime$(i%) + " "
        FOR z% = 1 TO 18
            pgmarray$(i%) = pgmarray$(i%) + " " + STR$(eventcondition%(i%,
z%))
        NEXT z%
    NEXT i%

END SUB

SUB ProgramMode limitflag% = 0
screenflag% = 1

'Has a setup been established?
IF SetUpFlag% = 0 THEN
    message$ = "A SETUP must have been loaded or created before
PROGRAM MODE can be executed.  Hit any key to continue..."
    CALL errorwait(message$)
    EXIT SUB
END IF

DO

LOCATE 4, 1
    CALL qprint0(STRING$(80, " "), 7)
    LOCATE 4, 34
    CALL qprint0("PROGRAM MODE", 7)

'Show current setup status
    CALL displaystatus(screenflag%, limitflag%)

Keylabel(1) = "Run (active)"
    Keylabel(2) = "              "
    Keylabel(3) = "Change Prog "
    Keylabel(4) = "Load Prog    "
    Keylabel(5) = "Save Prog   "
    Keylabel(6) = "              "
    Keylabel(7) = "              "
    IF limitflag% = 0 THEN
        Keylabel(8) = "Limits      "
    ELSE
        Keylabel(8) = "Output      "
    END IF
    Keylabel(9) = "Other Screen"
    Keylabel(10) = "MAIN         "

CALL fillkeys
    CALL GetFKey(fcode%)

SELECT CASE fcode%
        CASE 1
            IF pgmflag% = 0 THEN
                message$ = "A PROGRAM must have been loaded or created
before PROGRAM RUN can be executed.  Hit any key to continue..."
                CALL errorwait(message$)
            ELSE
                CALL PgmRun(screenflag%, limitflag%)
            END IF
```

```
            CASE 3
                CALL ChangePgm(screenflag%, limitflag%)
            CASE 4
                CALL LoadPgm(screenflag%, limitflag%)
            CASE 5
                CALL SavePgm
            CASE 8
                IF limitflag% = 0 THEN
                    limitflag% = 1
                ELSE
                    limitflag% = 0
                END IF
            CASE 9
                IF screenflag% = 1 THEN
                    screenflag% = 2
                ELSE
                    screenflag% = 1
                END IF
            CASE 10
                GOTO EndPgmMode
            CASE ELSE
                CALL chime(6)
            END SELECT
LOOP EndPgmMode:
CLS

END SUB

SUB ReadHardwareConfig filenum% = FREEFILE
OPEN "c:\scepter\hardware.cnf" FOR INPUT AS #filenum%

FOR channelnum% = 1 TO 18
    INPUT #filenum%, Channel(channelnum%).ScepterCardBase, Channel(channelnum%).DTCardBase, Channel(channelnum%).PositionOnCard
NEXT channelnum%

END SUB

SUB SavePgm
DIM ev%(1 TO 18)

Keylabel(1) = " "
    Keylabel(2) = " "
    Keylabel(3) = " "
    Keylabel(4) = " "
    Keylabel(5) = " "
    Keylabel(6) = " "
    Keylabel(7) = " "
    Keylabel(8) = " "
    Keylabel(9) = " "
    Keylabel(10) = "Exit"

CALL fillkeys

LOCATE 22, 1
CALL qprint0(STRING$(80, " "), 7)

pgmfilenum% = FREEFILE
```

```
ON ERROR GOTO fileerror openerror% = 0
   LOCATE 22, 1
   CALL qprint0(STRING$(80, " "), 7)
   LOCATE 22, 4
   CALL qprint0("Input name of program to save (no path or exten-
sion): ", 7)
   LOCATE 22, 59 text$ = " "
   CALL textin(text$, 8, 0, 0, exitcode%, 7)
   IF exitcode% = 2 OR exitcode% = 4 THEN GOTO exitsavepgm
   a$ = "c:\scepter\pgm\" + text$ + ".PGM"
   there = Exist(a$)
   IF there = -1 THEN GOTO badname2
StartPGMFile:
   OPEN a$ FOR OUTPUT AS #pgmfilenum%

IF openerror% = -1 THEN
       LOCATE 22, 1
       CALL qprint0(STRING$(80, " "), 7)
       message$ = "Bad file name.  Hit any key to continue"
       CALL errorwait(message$)
       openerror% = 0
       EXIT SUB
   END IF FOR e% = 0 TO maxevent%
       FOR z% = 1 TO 18
          ev%(z%) = eventcondition%(e%, z%)
       NEXT z%
       WRITE #pgmfilenum%, eventtime$(e%), ev%(1), ev%(2), ev%(3),
 ev%(4), ev%(5), ev%(6), ev%(7), ev%(8), ev%(9), ev%(10), ev%(11),
ev%(12), ev%(13), ev%(14), ev%(15), ev%(16), ev%(17), ev%(18)

IF openerror% = -1 THEN
           LOCATE 22, 1
           CALL qprint0(STRING$(80, " "), 7)
           message$ = "Bad file name.  Hit any key to continue"
           CALL errorwait(message$)
           openerror% = 0
           EXIT SUB
       END IF
   NEXT e%

ON ERROR GOTO 0
   CLOSE #pgmfilenum%
   GOTO exitsavepgm badname2:
    CALL chime(2)
    CALL chime(4)
    LOCATE 22, 1
    CALL qprint0(STRING$(80, " "), 7)
    message$ = "File already exists.  Overwrite it? (Y or N): "
    yn$ = "N"
    CALL YesNo(yn$, message$, scancode%, 7, 7, 22, 4)
    IF yn$ = "y" OR yn$ = "Y" THEN GOTO StartPGMFile exitsavepgm:
  LOCATE 22, 1
```

```
CALL qprint0(STRING$(80, " "), 7)

END SUB

SUB SaveSetupFile

Keylabel(1) = " "
    Keylabel(2) = " "
    Keylabel(3) = " "
    Keylabel(4) = " "
    Keylabel(5) = " "
    Keylabel(6) = " "
    Keylabel(7) = " "
    Keylabel(8) = " "
    Keylabel(9) = " "
    Keylabel(10) = "Exit"
    CALL fillkeys LOCATE 22, 1
CALL qprint0(STRING$(80, " "), 7)

setfilenum% = FREEFILE
ON ERROR GOTO fileerror openerror% = 0
    LOCATE 22, 1
    CALL qprint0(STRING$(80, " "), 7)
    LOCATE 22, 4
    CALL qprint0("Input name of setup to save (no path or extension): ", 7)
    LOCATE 22, 59 text$ = " "
    CALL textin(text$, 8, 0, 0, exitcode%, 7)
    IF exitcode% = 2 OR exitcode% = 4 THEN GOTO exitsavesetup a$ = "c:\scepter\set\" + text$ + ".SET"
    there = Exist(a$)
    IF there = -1 THEN GOTO AlreadyExists StartSetFile:
    OPEN a$ FOR OUTPUT AS #setfilenum%

IF openerror% = -1 THEN
        LOCATE 22, 1
        CALL qprint0(STRING$(80, " "), 7)
        message$ = "Bad file name.  Hit any key to continue"
        CALL errorwait(message$)
        openerror% = 0
        EXIT SUB
    END IF FOR i% = 1 TO 18
        WRITE #setfilenum%, status(i%).Active, status(i%).OnOff,
status(i%).VorI, status(i%).ACorDC, status(i%).setting, status(i%).U-
Limit, status(i%).LLimit
        IF openerror% = -1 THEN
            LOCATE 22, 1
            CALL qprint0(STRING$(80, " "), 7)
            message$ = "Bad file name.  Hit any key to continue"
            CALL errorwait(message$)
```

```
            openerror% = 0
            EXIT SUB
        END IF
    NEXT i%

ON ERROR GOTO 0
        CLOSE #setfilenum%
        LOCATE 22, 1
        CALL qprint0(STRING$(80, " "), 7)
        GOTO exitsavesetup AlreadyExists:
        CALL chime(2)
        CALL chime(4)
        LOCATE 22, 1
        CALL qprint0(STRING$(80, " "), 7)
        message$ = "File already exists. Overwrite it? (Y or N): "
        yn$ = "N"
        CALL YesNo(yn$, message$, scancode%, 7, 7, 22, 4)
        IF yn$ = "y" OR yn$ = "Y" THEN GOTO StartSetFile exitsavesetup:
LOCATE 22, 1
CALL qprint0(STRING$(80, " "), 7)

END SUB

SUB SetAlarms

FOR i% = 1 TO 18
    IF status(i%).Active = 1 THEN
        IF status(i%).OnOff = 0 THEN
        'Output is OFF, so set alarm to off
            outputs(i%).alarm = 0
        ELSE
        'Output is ON, so check for alarm conditions
            IF status(i%).VorI = 0 THEN
                IF outputs(i%).readvolts <= status(i%).LLimit THEN
                    outputs(i%).alarm = -1
                ELSEIF outputs(i%).readvolts >= status(i%).ULimit THEN
                    outputs(i%).alarm = 1
                ELSE outputs(i%).alarm = 0
                END IF
            ELSE
                IF outputs(i%).readamps <= status(i%).LLimit THEN
                    outputs(i%).alarm = -1
                ELSEIF outputs(i%).readamps >= status(i%).ULimit THEN
                    outputs(i%).alarm = 1
                ELSE outputs(i%).alarm = 0
                END IF
            END IF
        END IF
    END IF
NEXT i%
END SUB SUB SetSetting (i%)

LowByteAddress% = Channel(i%).ScepterCardBase + 1 + (4 * (Channel(i%).PositionOnCard - 1))
```

```
HiByteAddress% = LowByteAddress% + 1
LatchAddress% = LowByteAddress% + 2

IF status(i%).VorI = 0 THEN
    OutputValue% = ((status(i%).setting + 10!) / 20!) * 16384
'Don't let value wrap around
    IF OutputValue% = 16384 THEN
        OutputValue% = 16383
    END IF
ELSE
    OutputValue% = ((status(i%).setting + 2!) / 4!) * 16384
    IF OutputValue% = 16384 THEN
        OutputValue% = 16383
    END IF
END IF OutputValueH% = OutputValue% \ 256
OutputValueL% = OutputValue% MOD 256

OUT LowByteAddress%, OutputValueL%
OUT HiByteAddress%, OutputValueH%
OUT LatchAddress%, 0

END SUB

SUB Setup limitflag% = 0
screenflag% = 1

DO

LOCATE 4, 1
CALL qprint0(STRING$(80, " "), 7)
LOCATE 4, 38
CALL qprint0("SETUP", 7)
'Show current setup status
    CALL displaystatus(screenflag%, limitflag%)

Keylabel(1) = "              "
    Keylabel(2) = "              "
    Keylabel(3) = "Change Setup"
    Keylabel(4) = "Load Setup    "
    Keylabel(5) = "Save Setup    "
    Keylabel(6) = "              "
    Keylabel(7) = "              "
IF limitflag% = 0 THEN
    Keylabel(8) = "Limits        "
ELSE
    Keylabel(8) = "Output        "
END IF
Keylabel(9) = "Other Screen"
Keylabel(10) = "MAIN          "

CALL fillkeys

CALL GetFKey(fcode%)
SELECT CASE fcode%
    CASE 3
        CALL ChangeSetup(screenflag%, limitflag%)
    CASE 4
```

```
              CALL LoadSetupFile(screenflag%, limitflag%)
              CALL OutputSCEPTERStatus
          CASE 5
              CALL SaveSetupFile
          CASE 8
              IF limitflag% = 0 THEN
                 limitflag% = 1
                 Keylabel(8) = "Output      "
                 CALL fillkeys
              ELSE
                 limitflag% = 0
                 Keylabel(8) = "Limits      "
                 CALL fillkeys
              END IF
              CALL displaystatus(screenflag%, limitflag%)

CASE 9
              IF screenflag% = 1 THEN
                 screenflag% = 2
              ELSE
                 screenflag% = 1
              END IF CALL displaystatus(screenflag%, limitflag%)
          CASE 10
              GOTO EndSetup
          CASE ELSE
              CALL chime(6)
       END SELECT
LOOP
EndSetup:

'See if any channels are now active
SetUpFlag% = 0
FOR i% = 1 TO 18
    IF status(i%).Active = 1 THEN
        SetUpFlag% = 1
    END IF
NEXT i%

CLS

END SUB

SUB ShowElapsedTime (ElapsedTime&)

LOCATE 4, 64
CALL qprint0(STRING$(17, " "), 7)
LOCATE 4, 64
CALL qprint0("Elapsed: " + Num2Time$(ElapsedTime&), 7)

END SUB

SUB ShowOutputs (screenflag%, limitflag%)

IF screenflag% = 1 THEN
        startpos% = 0
    ELSE
        startpos% = 9
    END IF
```

```
    IF limitflag% = 1 THEN
        FOR i% = 1 TO 9
            IF outputs(i% + startpos%).alarm = 1 THEN
                UColor% = 240
                LColor% = 112
            ELSEIF outputs(i% + startpos%).alarm = -1 THEN
                UColor% = 112
                LColor% = 240
            ELSE
                UColor% = 112
                LColor% = 112
            END IF IF status(i% + startpos%).Active = 1 THEN
                IF status(i% + startpos%).VorI = 0 THEN
                    CALL pusing(STR$(status(i% + startpos%).ULimit), "##.##
V", UColor, UColor, 0, 19, 8 * i% - 3)
                    CALL pusing(STR$(status(i% + startpos%).LLimit), "##.##
V", LColor, LColor, 0, 20, 8 * i% - 3)
                ELSE
                    CALL pusing(STR$(status(i% + startpos%).ULimit), "##.##
m", UColor, UColor, 0, 19, 8 * i% - 3)
                    CALL pusing(STR$(status(i% + startpos%).LLimit), "##.##
m", LColor, LColor, 0, 20, 8 * i% - 3)
                END IF
            END IF NEXT i%
    ELSE
        FOR i% = 1 TO 9
            IF outputs(i% + startpos%).alarm = 1 THEN
                ncolor% = 240
            ELSEIF outputs(i% + startpos%).alarm = -1 THEN
                ncolor% = 240
            ELSE
                ncolor% = 112
            END IF IF status(i% + startpos%).Active = 1 THEN
                IF status(i% + startpos%).VorI = 0 THEN
                    CALL pusing(STR$(outputs(i% + startpos%).readvolts),
"##.## V", ncolor, ncolor, 0, 19, 8 * i% - 3)
                    CALL pusing(STR$(outputs(i% + startpos%).readamps),
"##.## m", 112, 112, 0, 20, 8 * i% - 3)
                ELSE
                    CALL pusing(STR$(outputs(i% + startpos%).readvolts),
"##.## V", 112, 112, 0, 19, 8 * i% - 3)
                    CALL pusing(STR$(outputs(i% + startpos%).readamps),
"##.## m", ncolor, ncolor, 0, 20, 8 * i% - 3)
                END IF
            END IF
        NEXT i%
    END IF

END SUB

SUB Utilities message$ = "No Utilities are installed at this time.  Hit any key to
continue..."
CALL errorwait(message$)
```

END SUB

FUNCTION Value2Amps# (Value%)

Value2Amps# = (2! * (Value% / 4096)) + currentoffset#

END FUNCTION

FUNCTION Value2Volts# (Value%)

Value2Volts# = 10! * (Value% / 4096)

END FUNCTION

The power supply 10 is constructed and adapted so that the voltage of the selected signal can be varied in increments of 10 $2^{14}$ volt increments and so that current of the selected signal can be varied in increments of 2 $2^{14}$ milliamps These increments are ideally correct. However, in practice primarily due to the limitations of the electronic components these ideal increments are not achievable. As a practical matter, the voltage of the selected signal can be varied in increments of 0.01 volts, and the current can be varied in increments of 0.01 milliamps.

Using the power supply 10 constructed as shown in FIG. 2 and programmed in the manner described in detail before, the power out per channel was (10 volts×2 milliamps) or 0.02 watts per channel. The control was 14 bit accuracy in the outputted voltage or current.

Changes may be made in the construction and the operation of the various components and elements described herein and changes may be made in the steps or the sequence of steps of the methods described herein without departing from the spirit and scope of the invention as defined in the following claims.

What is claimed is:

1. A power supply comprising:
   means for providing a DC reference voltage signal having a predetermined voltage value;
   means for providing an AC reference voltage signal having a predetermined peak voltage value;
   means for selecting one of the DC reference voltage signal or the AC reference voltage signal and outputting the selected DC reference voltage signal or AC reference voltage signal;
   means for receiving the selected DC reference voltage signal or AC reference voltage signal and for receiving a scale signal indicating a predetermined voltage or peak voltage and for scaling the voltage of the received DC reference voltage signal to the predetermined voltage indicated via the select signal or scaling the AC reference voltage signal to the predetermined peak voltage value indicated via the select signal and outputting the scaled AC referenced voltage signal or the scaled DC reference voltage signal;
   means for outputting the scale signal;
   means for receiving the scaled DC reference voltage signal or the scaled AC reference voltage signal and converting the received DC reference voltage signal to a DC reference current signal or converting the received AC reference voltage signal to an AC reference current signal and outputting the DC reference current signal or the AC reference current signal; and
   means for receiving the scaled DC reference voltage signal or receiving the scaled AC reference voltage signal and for receiving the scaled AC reference voltage signal and for receiving the DC reference current signal or the AC reference current signal and outputting one of the scaled DC reference voltage signal or the scaled AC reference voltage signal or the AC reference current signal or the DC reference current signal as a selected signal.

2. The power supply of claim 1 further comprising:
   means for monitoring the voltage and current of the selected signal at periodic intervals of time and outputting the monitored voltage and current selected signal at predetermined intervals of time in a human perceivable format.

3. The power supply of claim 2 wherein the means for monitoring the selected signal is further defined as outputting the monitored voltage and current in a printed format.

4. The power supply of claim 2 wherein the means for monitoring the voltage and current in the selected signal is defined further as outputting the monitored voltage and current on a display in a visually perceivable display.

5. The power supply of claim 1 adapted for sensing the temperature of an object wherein the power supply further comprises:

means for sensing the temperature of the object and outputting temperature signals indicative of the sensed temperature of the object;

means for selecting not to output the selected signal and for selecting to receive the temperature signals and to monitor the temperature signals at predetermined intervals of time and output the monitored temperature signals in a human perceivable format.

6. The power supply of claim 1 adapted to sense the temperature of an object in one mode of operation wherein the power supply further comprises:

means for monitoring the voltage and current of the selected signal at periodic intervals of time and outputting the monitored voltage and current selected signal at predetermined intervals of time in human perceivable format;

a temperature probe for sensing the temperature of an object and outputting temperature signals indicative of the sensed temperature of the object; and wherein the means for monitoring the voltage and current of the selected signal is further defined as monitoring the voltage and current of the selected signal at periodic time intervals and outputting the monitored voltage and current of the selected signal in human perceivable format in one mode of operation, and in one other mode of operation receiving the temperature signals and outputting the monitored temperature signals at periodic intervals of time in a human perceivable format.

7. The power supply of claim 1 wherein the means for providing the AC referenced voltage signal comprises:

a processor having a power supply with a DC voltage signal;

means for receiving the DC voltage signal from the processor, and generating an AC voltage signal, and scaling the AC voltage signal to a predetermined peak voltage and outputting the scaled AC voltage signal as the AC reference voltage signal.

8. The power supply of claim 7 wherein the processor is further defined as a general purpose digital computer.

9. The power supply of claim 8 wherein the means for outputting the scale signal comprises the processor and wherein the processor is programmed to receive the scale signal and to output the scale signal.

10. The power supply of claim 9 further comprising:

means for monitoring the voltage and current of the selected signal at periodic intervals of time and outputting the monitored voltage and current selected signal at predetermined intervals of time in a human perceivable format;

a display for receiving the monitored voltage and current of the selected signal and outputting the monitored voltage and current of the selected signal; and wherein the processor is defined further as receiving the monitored voltage and current of the selected signal signals and outputting to the display the monitored voltages and current of the selected signal at the predetermined time intervals.

11. The power supply of claim 10 wherein the means for monitoring the voltage and current of the selected signal comprises:

a printer for receiving the monitored voltage and current of the selected signal and outputting the monitored voltage and current of the selected signal in a printed format; and wherein the processor is defined further as outputting to the printer the monitored voltage and current of the selected signal at predetermined time intervals.

12. A power supply comprising:

a processor having a power supply with a DC voltage signal, the processor being programmed to output first switch signal indicating the selection of a DC reference voltage signal or an AC reference voltage signal and to output a second switch signal indicating the selection of either a voltage or current signal, and the processor outputting a scale signal indicating a selected predetermined voltage between an upper limit and a lower limit;

means for receiving the DC voltage signal and scaling the voltage of the DC voltage signal to a predetermined voltage and outputting the scaled DC voltage signal as a DC reference voltage signal;

means for receiving the scaled DC reference voltage signal and generating an AC reference voltage signal and outputting the AC reference voltage signal; a plurality of channels, each channel comprising:

means for receiving the DC reference voltage signal and the AC reference voltage signal and the first switch signal and selecting the DC reference voltage signal in response to the first switch signal voltage signal or selecting the AC reference voltage signal in response to the first switch signal indicating the selection of AC reference voltage signal and outputting the selected DC reference voltage signal or the AC reference voltage signal;

means for receiving the selected DC reference voltage signal or the selected AC reference voltage signal and the scale signal and scaling the voltage value of the DC reference voltage signal to the predetermined voltage value indicated via the select signal and outputting the scaled DC reference voltage signal or scaling the voltage value of the AC reference voltage signal to the predetermined value indicated via the select signal and outputting the scaled AC reference voltage signal;

means for receiving the scaled DC reference voltage signal or the scaled AC reference voltage signal and converting the scaled DC reference voltage signal to a scaled DC reference current signal or receiving the scaled AC reference voltage signal and converting the scaled AC reference voltage signal to a scaled AC reference current signal and outputted the scaled AC reference current signal; and means for receiving the scaled DC reference voltage signal or the scaled AC reference voltage signal and the scaled DC reference current signal or the scaled AC reference current signal and receiving the second switch signal and outputting the received scaled DC reference voltage signal or the received AC reference voltage signal in response to receiving a second switch signal indicating the selection of voltage or outputting either the scaled DC reference current signal or the scaled AC reference current signal in response to receiving the second switch signal indicating the selection of current, the outputted scaled DC reference voltage signal or the scaled AC reference voltage signal or the DC reference current signal or the AC reference current signal as the selected signal.

13. The power supply of claim 12 further comprising:
means for monitoring the current and voltage of the selected signal and outputting at predetermined intervals of time the current and voltage of the selected signal in a human perceivable format.

14. The power supply claim 13 wherein the means for monitoring the selected signal is further defined as outputting the monitored voltage and current in a printed format.

15. The power supply of claim 13 wherein the means for monitoring the voltage and current in the selected signal is defined further as outputting the monitored voltage and current in on a display in a visually perceivable display.

16. The power supply of claim 12 adapted to sense the temperature of an object wherein the power supply further comprises:
a temperature probe for sensing the temperature of an object and outputting temperature signals indicative of the sensed temperature of the object; and
means for receiving the temperature signals and monitoring the temperature signals and outputting the monitored temperature signals at periodic intervals of time in a human perceivable format.

17. The power supply of claim 12 wherein the processor is further defined as a general purpose digital computer.

18. The power supply of claim adapted to sense the temperature of an object in one mode of operation wherein the power supply further comprises:
means for monitoring the current and voltage of the selected signal and outputting at predetermined intervals of time the current and voltage of the selected signal in a human perceivable format;
a temperature probe for sensing the temperature of an object and outputting temperature signals indicative of the sensed temperature of the object; and wherein the means for monitoring the voltage and current of the selected signal is further defined as monitoring the voltage and current of the selected signal at periodic time intervals and outputting the monitored voltage and current of the selected signal in a human perceivable format in one mode of operation, and in one other mode of operation receiving the temperature signals and outputting the monitored temperature signals at periodic intervals of time in a human perceivable format.

19. The power supply of claim 13 wherein the means for monitoring the voltage and the current of the selected signal comprises:
a display for receiving the monitored voltage and current of the selected signal and outputting the monitored voltage and current of the selected signal; and wherein the processor is defined further as receiving the monitored voltage and current of the selected signal signals and outputting to the display the monitored voltages and current of the selected signal at the predetermined time intervals.

20. The power supply of claim 19 wherein the means for monitoring the voltage and current of the selected signal comprises:
a printer for receiving the monitored voltage and current of the selected signal and outputting the monitored voltage and current of the selected signal in a printed format; and wherein the processor is defined further as outputting to the printer the monitored voltage and current of the selected signal at predetermined time intervals.

21. A power supply comprising:
a processor having a power supply with a DC voltage signal, the processor being programmed to provide a plurality of a first switch signals with each first switch signal indicating the selection of a DC reference voltage signal or an AC reference voltage signal and to output a plurality of second switch signals with each second switch signal indicating the selection of either a voltage or current signal, and the processor outputting a plurality of select signals with each select signal indicating a selected predetermined voltage between an upper limit and a lower limit;
means for receiving the DC voltage signal and scaling the voltage of the DC voltage signal to a predetermined voltage and outputting the scaled DC voltage signal as a DC reference voltage signal; and
means for receiving the scaled DC voltage signal and generating an AC reference voltage signal and outputting the AC reference voltage signal;
a plurality of channels, each channel comprising:
means for receiving the DC reference voltage signal and the AC reference voltage signal and the first switch signal and selecting the DC reference voltage signal in response to the first switch signal indicating the selection of DC or selecting the AC reference voltage signal in response to the first switch signal indicating the selection of AC and outputting the selected DC reference voltage signal or the AC reference voltage signal;
means for receiving the selected DC reference voltage or the selected AC reference voltage reference and one of the select signals and scaling the voltage value of the DC reference voltage signal to the predetermined voltage value indicated via the select signal and outputting the scaled DC reference voltage signal or scaling the voltage value of the AC reference voltage signal to the predetermined value indicated via the select signal and outputting the scaled AC reference voltage signal;
means for receiving the scaled DC reference voltage signal or the scaled AC reference voltage signal and converting the scaled DC reference voltage signal to a scaled DC current reference signal or receiving the scaled AC reference voltage signal and converting the scaled AC reference voltage signal to a scaled AC reference current signal and outputted the scaled AC reference current signal; and
means for receiving the scaled DC reference voltage signal or the scaled AC reference voltage signal and the scaled DC reference current signal or the scaled AC reference current signal and receiving the second switch signal and outputting the received scaled DC reference voltage signal or the received AC reference voltage signal in response to receiving a second switch signal indicating the selection of voltage or outputting either the scaled DC reference current signal or the scaled AC reference current signal in response to receiving the second switch signal indicating the selection of current, the outputted scaled DC reference voltage signal or the scaled AC reference voltage signal or the DC reference current signal or the AC reference current signal as the selected signal.

22. The power supply of claim 21 further comprising: means for monitoring the current and voltage of the selected signal outputted by each channel and outputting at predetermined intervals of time selected for each channel the current and voltage of each of the selected signals in a human perceivable format.

23. The power supply claim 22 wherein the means for monitoring the selected signals is further defined as outputting the monitored voltage and current for each of the channels in a printed format.

24. The power supply of claim 22 wherein the means for monitoring the voltage and current in the selected signals is defined further as outputting the monitored voltage and current for each channel on a display in a visually perceivable display.

25. The power supply of claim 21 adapted to sense the temperature of an object wherein at least one of the channels further comprises:
a temperature probe for sensing the temperature of an object and outputting temperature signals indicative of the sensed temperature of the object; and
means for receiving the temperature signals and monitoring the temperature signals and outputting the monitored temperature signals at periodic intervals of time in human perceivable format.

26. The power supply of claim 21 wherein the processor is further defined as a general purpose digital computer.

27. The power supply of claim 22 adapted to sense the temperature of an object in one mode of operation wherein at least one of the channels further comprises:
a temperature probe for sensing the temperature of an object and outputting temperature signals indicative of the sensed temperature of the object; and
wherein the means for monitoring the voltage and current of the selected signal is further defined as monitoring the voltage and current of the selected signal at periodic time intervals and outputting the monitored voltage and current of the selected signal in human perceivable format in one mode of operation, and in one other mode of operation receiving the temperature signals and outputting the monitored temperature signals at periodic intervals of time in a human perceivable format.

28. The power supply of claim 22 wherein the means for monitoring the voltage and the current of the selected signal comprises:
a display for receiving the monitored voltage and current of the selected signal and outputting the monitored voltage and current of the selected signal; and
wherein the processor is defined further as receiving the monitored voltage and current of the selected signal signals and outputting to the display the monitored voltages and current of the selected signal at the predetermined time intervals.

29. The power supply of claim 28 wherein the means for monitoring the voltage and current of the selected signal comprises:
a printer for receiving the monitored voltage and current of the selected signal and outputting the monitored voltage and current of the selected signal in a printed format; and wherein the processor is defined further as outputting to the printer the monitored voltage and current of the selected signal at predetermined time intervals.

30. The power supply of claim 21 further comprising: means for receiving a signal disconnecting the AC and DC reference voltage signal in an OFF condition of the channel and for connecting the AC and DC reference voltage signal to the channel in an ON condition of the channel; and wherein the processor outputs the signal for conditioning each channel in the ON and OFF conditions.

31. The power supply of claim 30 wherein the processor is programmable to condition each channel in the ON and OFF conditions at preprogrammed times.

* * * * *

UNITED STATES PATENT AND TRADEMARK OFFICE
CERTIFICATE OF CORRECTION

PATENT NO. : 5,103,110

DATED : April 7, 1992

INVENTOR(S) : Housworth, et al.

It is certified that error appears in the above-identified patent and that said Letters Patent is hereby corrected as shown below:

Column 4, line 18, add the words --programmed to-- after the word, is.

Column 12, line 8, delete "c:SCEPTERset" and substitute therefore --c:\SCEPTER/set--.

Column 12, line 19, delete "c:SCEPTER/set" and substitute therefore --c:\SCEPTER/set--.

Column 13, line 24, delete the word "any" and substitute therefore the word --Any--.

Column 15, line 15, delete the word "Vent" and substitute the word --Event--.

Column 15, line 16, delete the word "even" and substitute therefor the word --event--.

Column 15, line 30, delete the word "the" and substitute the word --The--.

UNITED STATES PATENT AND TRADEMARK OFFICE
CERTIFICATE OF CORRECTION

PATENT NO. : 5,103,110

DATED : April 7, 1992

INVENTOR(S) : Housworth, et al.

It is certified that error appears in the above-identified patent and that said Letters Patent is hereby corrected as shown below:

Column 15, line 43, delete "c/scepter/" and substitute therefore --c\scepter\--.

Column 15, line 65, delete "Path: c/data/" and substitute therefore --Path: c\data\--.

Column 15, line 68, delete "Path: c/scepter/set:" and substitute therefore --Path: c\scepter/set--.

Column 16, line 3, delete "Path: c/scepter/pgm" and substitute therefore --Path: c\scepter/pgm--.

Column 124, line 33, delete the word "the" and substitute therefore the word --a--.

Column 126, line 28, after the word, signal, add the following: --indicating the selection of the DC reference--.

Column 127, line 30, after the word, claim, please insert the numeral --12--.

Signed and Sealed this

Seventeenth Day of August, 1993

Attest:

BRUCE LEHMAN

Attesting Officer

Commissioner of Patents and Trademarks